United States Patent
Wang et al.

(10) Patent No.: US 10,110,405 B2
(45) Date of Patent: Oct. 23, 2018

(54) SYSTEM AND METHOD FOR NARROWBAND UPLINK SINGLE TONE TRANSMISSIONS

(71) Applicant: QUALCOMM Incorporated, San Diego, CA (US)

(72) Inventors: Renqiu Wang, San Diego, CA (US); Hao Xu, San Diego, CA (US); Xiao Feng Wang, San Diego, CA (US); Wanshi Chen, San Diego, CA (US); Yongbin Wei, La Jolla, CA (US); Seyed Ali Akbar Fakoorian, San Diego, CA (US); Alberto Rico Alvarino, San Diego, CA (US); Madhavan Srinivasan Vajapeyam, San Diego, CA (US); Jing Lei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 86 days.

(21) Appl. No.: 15/255,069

(22) Filed: Sep. 1, 2016

(65) Prior Publication Data
US 2017/0134199 A1     May 11, 2017

Related U.S. Application Data

(60) Provisional application No. 62/251,626, filed on Nov. 5, 2015, provisional application No. 62/252,358, filed on Nov. 6, 2015.

(51) Int. Cl.
*H04L 27/26* (2006.01)
*H04L 5/00* (2006.01)
(Continued)

(52) U.S. Cl.
CPC ......... *H04L 27/2602* (2013.01); *H04B 1/713* (2013.01); *H04L 5/0007* (2013.01);
(Continued)

(58) Field of Classification Search
CPC .. H03J 1/045; H01L 27/1288; H04L 27/2666; H04L 5/0007; H04B 7/066
See application file for complete search history.

(56) References Cited

U.S. PATENT DOCUMENTS

| 2009/0046646 A1* | 2/2009 | Cho ...................... H04L 1/1607 370/329 |
| 2012/0134430 A1* | 5/2012 | Li ......................... H04L 5/0046 375/260 |
| 2015/0223247 A1 | 8/2015 | Yang et al. |

OTHER PUBLICATIONS

3GPP, "TR 45.820", v.13.0.0, Aug. 2015, pp. 1-495.*
3GPP, "TR 45.820", v.13.0.0, Aug. 2015, pp. 1-495 (Year: 2015).*
(Continued)

*Primary Examiner* — Salvador E Rivas
(74) *Attorney, Agent, or Firm* — Arent Fox LLP

(57) ABSTRACT

An apparatus may receive signaling from a base station that indicates different tone indices. The apparatus may further transmit a plurality of symbols in a single tone uplink transmission. In an aspect, groups of symbols in the plurality of symbols are transmitted using the different tone indices of the single tone uplink transmission indicated by the received signaling. A second apparatus may signal to at least one user equipment (UE) information associated with different tone indices for use in transmitting a plurality of symbols in a single tone uplink transmission. The second apparatus may further receive the plurality of symbols in the single tone uplink transmission. In an aspect, pairs of symbols in the plurality of symbols are received in different tone indices of the single tone uplink transmission.

28 Claims, 16 Drawing Sheets

(51) Int. Cl.
*H04W 74/08* (2009.01)
*H04B 1/713* (2011.01)
*H04W 74/00* (2009.01)
*H04L 29/06* (2006.01)
*H04B 7/06* (2006.01)

(52) U.S. Cl.
CPC .......... *H04L 5/0012* (2013.01); *H04L 5/0048* (2013.01); *H04L 5/0051* (2013.01); *H04L 5/0055* (2013.01); *H04L 5/0057* (2013.01); *H04L 27/26* (2013.01); *H04L 69/24* (2013.01); *H04W 74/006* (2013.01); *H04W 74/0833* (2013.01); *H04B 7/066* (2013.01); *H04L 27/2666* (2013.01)

(56) References Cited

OTHER PUBLICATIONS

"3rd Generation Partnership Project; Technical Specitication Group GSM/EDGE Radio Access Network", Cellular system support for ultra-low complexity and low throughput Internet of Things (CIoT) ( Release 13), 3GPP Standard; 3GPP TR 45.820, 3rd Generation Partnership Project (3GPP), Mobile Competence Centre, 650, Route Deslucioles, F-06921 Sophia-Antipolis Cedex, France, vol. GERAN WG1, No. V13.0.0, Sep. 21, 2015 (Sep. 21, 2015), XP050996054, pp. 1-495.

International Search Report and Written Opinion—PCT/US2016/050132—ISA/EPO—dated Dec. 2, 2016.

Secretary TSG GERAN WG1 et al., "Draft Report of AD-HOC Geran 1 Meeting CIoT#2, Version 0.0.1", 3GPP Draft, GPC150306 Draft Report G1, V 0.0.1, 3GPP, Mobile Competency Center, 650, Route Des Lucioles, F-06921 Sophia-Anti-Polis Cedex, France, vol. GERAN WG1, no. Sophia Antipolis, France, Apr. 20, 2015-Apr. 23, 2015, Apr. 23, 2015, (Apr. 23, 2015), XP858945414, 61 Pages. Retrieved from the Internet: URL: http://www.3gpp.org/ftp/Meetings_3GPP_SYNC/SA6/GERAN/Docs/.

* cited by examiner

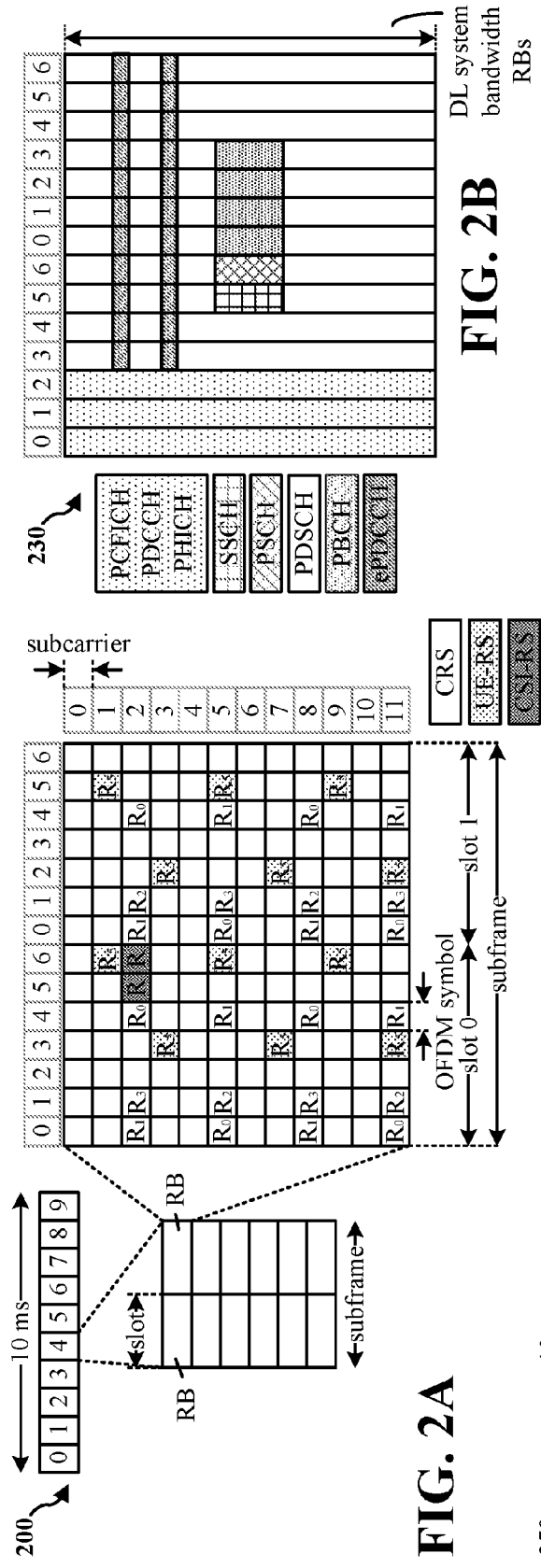
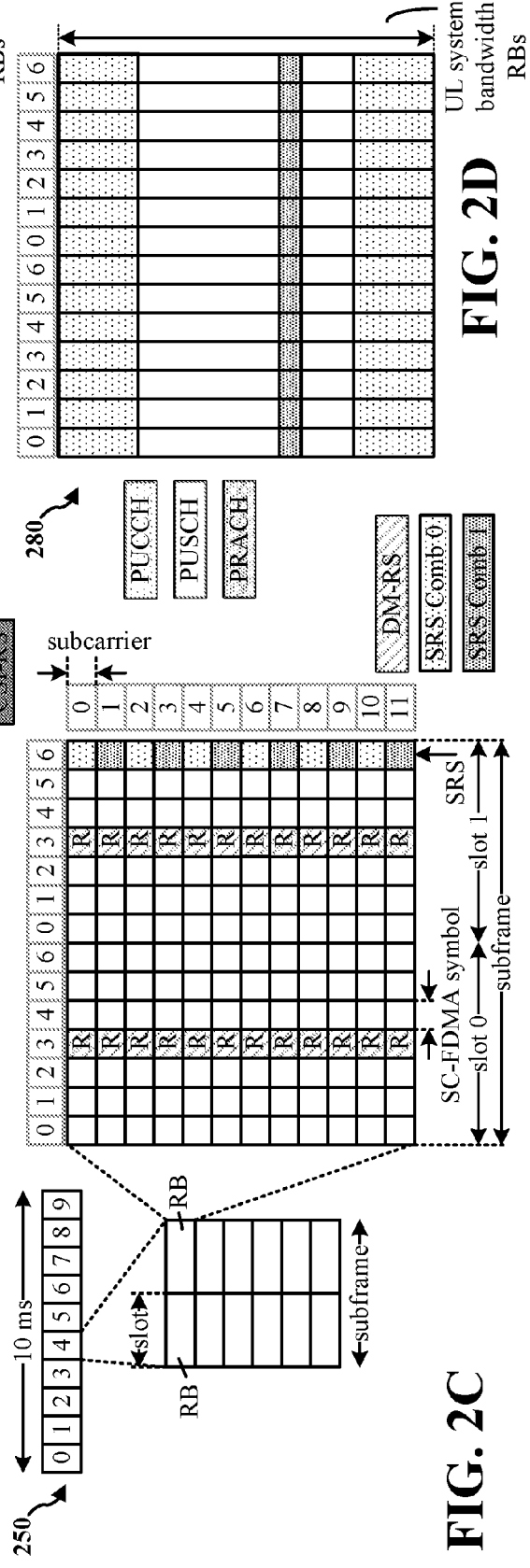
FIG. 2A
FIG. 2B
FIG. 2C
FIG. 2D

SYSTEM AND METHOD FOR NARROWBAND UPLINK SINGLE TONE TRANSMISSIONS

CROSS-REFERENCE TO RELATED APPLICATION(S)

This application claims the benefit of both U.S. Provisional Application Ser. No. 62/252,358, entitled "NARROWBAND UPLINK SINGLE TONE TRANSMISSIONS" and filed on Nov. 6, 2015, and U.S. Provisional Application Ser. No. 62/251,626, entitled "NARROWBAND UPLINK SINGLE TONE TRANSMISSION" and filed on Nov. 5, 2015, the disclosures of which are expressly incorporated by reference herein in their entireties.

BACKGROUND

Field

The present disclosure relates generally to communication systems, and more particularly, to narrowband single tone uplink transmissions.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A single resource block (RB) bandwidth has been contemplated for use in narrow band Long Term Evolution (NB-LTE) communications. However, a single RB bandwidth for use in uplink data transmissions using some network structures may have a limited dimension for multiplexing of uplink user data transmissions. This characteristic may be especially true for single tone uplink transmissions. Thus, the present disclosure provides address this characteristic by providing frequency hopping schemes to enable single tone uplink transmissions using NB-LTE.

A method, an apparatus, and a computer-readable medium for wireless communication are provided. The apparatus may receive signaling from a base station that indicates different tone indices. The apparatus may further transmit a plurality of symbols in a single tone uplink transmission. In an aspect, groups of symbols in the plurality of symbols are transmitted using the different tone indices of the single tone uplink transmission indicated by the received signaling.

A second method, a second apparatus, and a second computer-readable medium for wireless communication are also provided. The second apparatus may signal to at least one user equipment (UE) information associated with different tone indices for use in transmitting a plurality of symbols in a single tone uplink transmission. The second apparatus may further receive the plurality of symbols in the single tone uplink transmission. In an aspect, pairs of symbols in the plurality of symbols are received in different tone indices of the single tone uplink transmission.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating LTE examples of a DL frame structure, DL channels within the DL frame structure, an UL frame structure, and UL channels within the UL frame structure, respectively.

DETAILED DESCRIPTION

Figure 1:
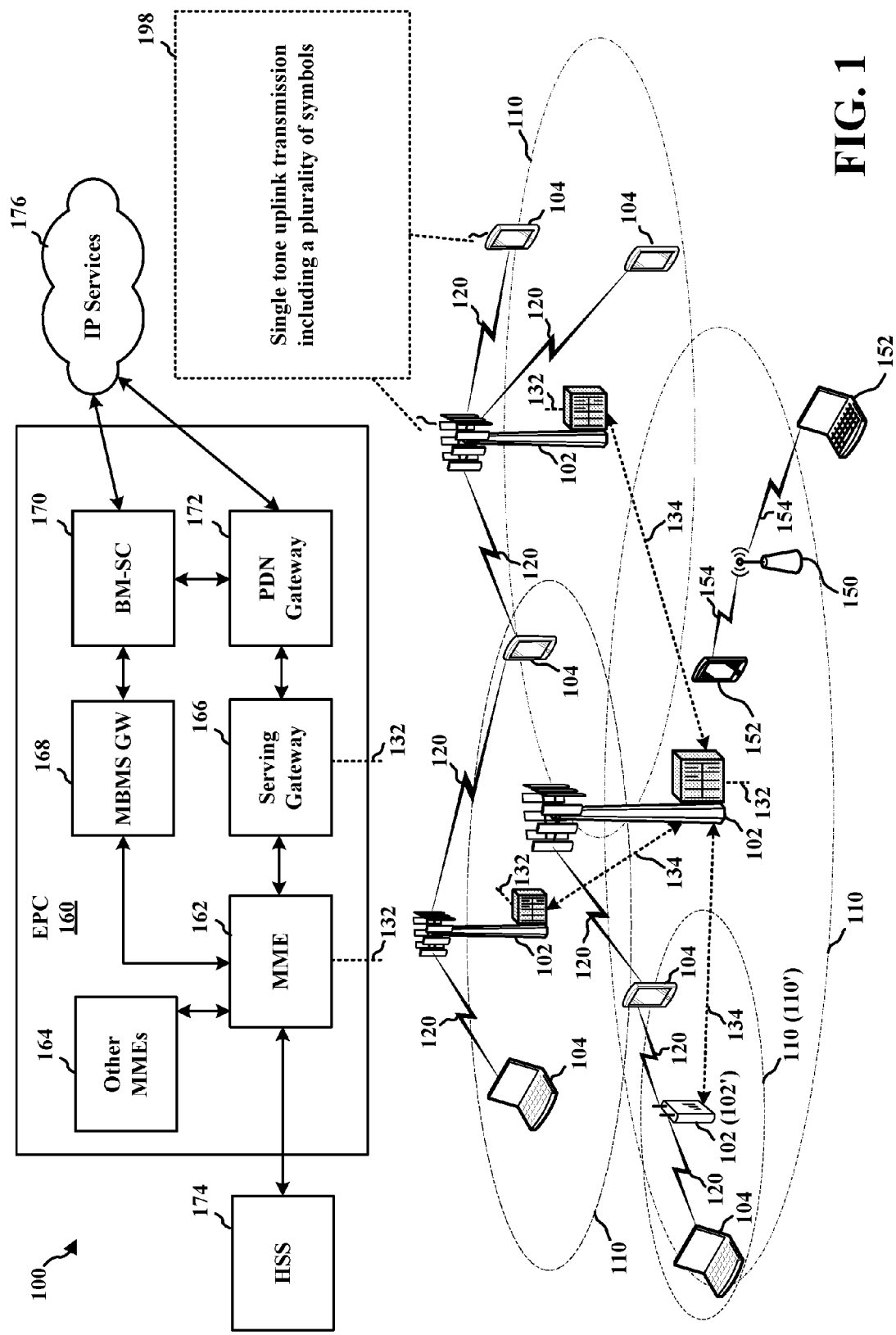
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the eNB 102 may signal, to the UE 104, information associated with different tone indices for use in transmitting a plurality of symbols in a single tone uplink transmission. The UE 104 may receive this information. The UE 104 may transmit a single tone uplink transmission 198, which includes a plurality of symbols. In an aspect, groups of symbols in the plurality of symbols are transmitted in the single tone uplink transmission 198 using the different tone indices indicated by the information from the eNB 102. Accordingly, the eNB 102 may receive the single tone uplink transmission 198 having the plurality of symbols, and pairs of symbols in the plurality of symbols are received in different tone indices of the single tone uplink transmission 198.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (HACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
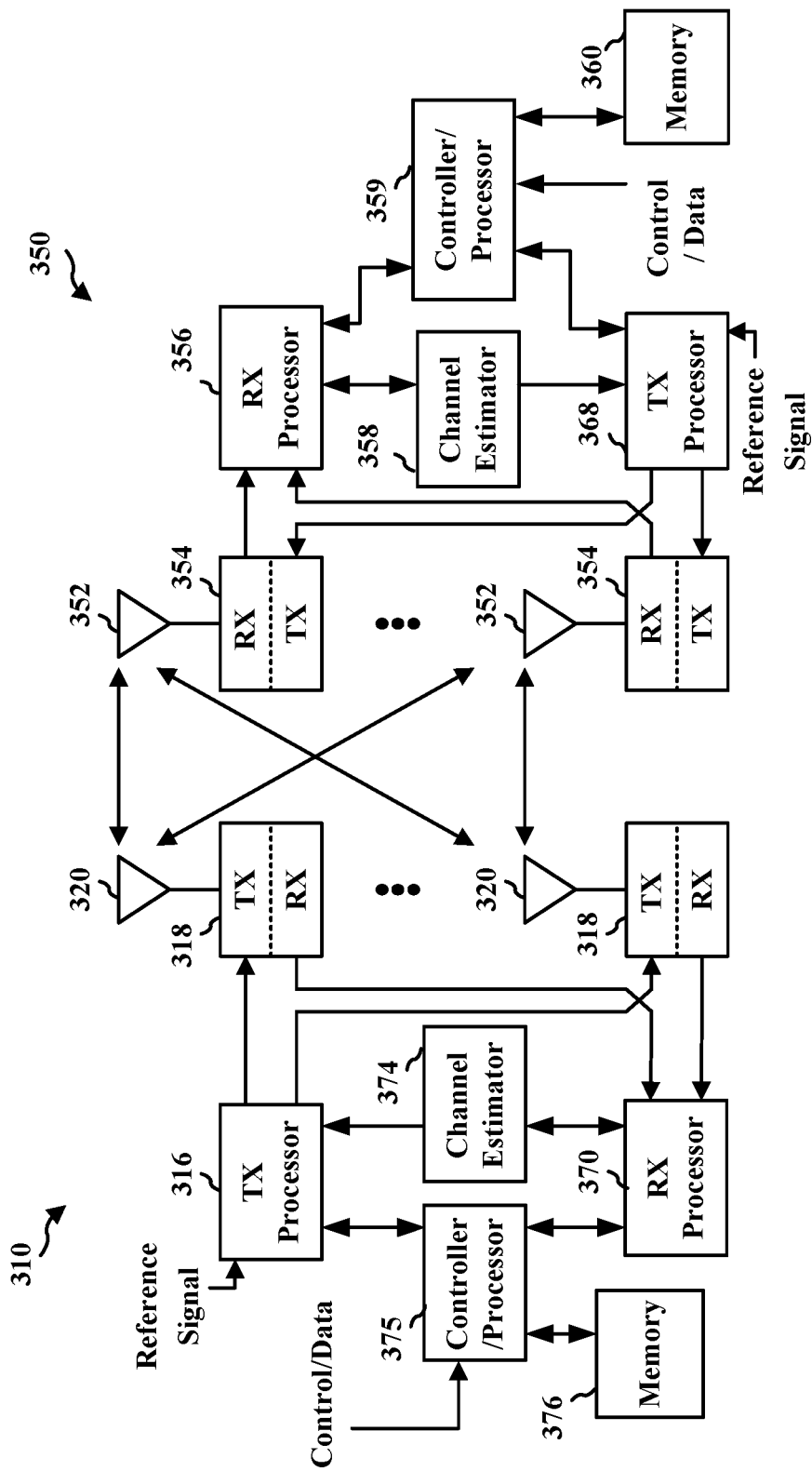
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

The cellular Internet of things (CIoT) interconnects "things" and exchanges data between them and the cellular network. "Things" may be UEs, machines, parts of machines, smart meters, household appliances, sensors or even everyday objects such as retail goods or wearables. CIoT may have different requirements for connectivity with a cellular network to support a large number of devices.

Narrowband LTE (NB-LTE) is an optimized variant of the widely deployed LTE technology that may be well-suited for the CIoT due to its low implementation cost, ease of use, and power efficiency. In addition, NB-LTE may provide improved indoor coverage, the ability to support of massive number of low-throughput UEs, low-delay sensitivity, ultra-low device cost, lower device power consumption, and optimized network architecture. For example, NB-LTE may be deployed utilizing the resource blocks (RBs) within an LTE carrier and/or in the unused RBs within a guard-band of an LTE carrier.

A single RB per subframe bandwidth has been contemplated for use in NB-LTE communications to help further improve CIoT communications with the cellular network. However, a single RB bandwidth for use in uplink data transmissions using the existing network structure, which generally has two RBs per subframe, has a limited dimension for multiplexing of uplink user data transmissions. This may be especially true for single tone uplink transmissions, which reduces the number of tones per RB from twelve to one. Thus, the present disclosure provides a solution to this problem by providing frequency hopping schemes to enable single tone uplink transmissions using NB-LTE.

For example, the present disclosure enables frequency division multiplexing of single tone uplink transmissions for multiple users that may increase a signal-to-noise ratio (SNR) per tone that is increased by, e.g., $10*\log 10(12) \approx 11$ dB. This increase in SNR may be caused by cell energy being concentrated to a single tone from twelve tones, and may allow for cross-subframe coding. In addition, the present disclosure provides a redesigned frame structure related to the number and location of reference signal (RS) symbols within the subframes of the PUSCH and PUCCH, a decrease in payload size, and long bundling which may provide a large coverage enhancement. Moreover, the present disclosure provides a solution to limitations caused by large cell sizes and cyclic prefix (CP) lengths associated with PRACH to enable single tone uplink transmissions in the PRACH.

Figure 4:
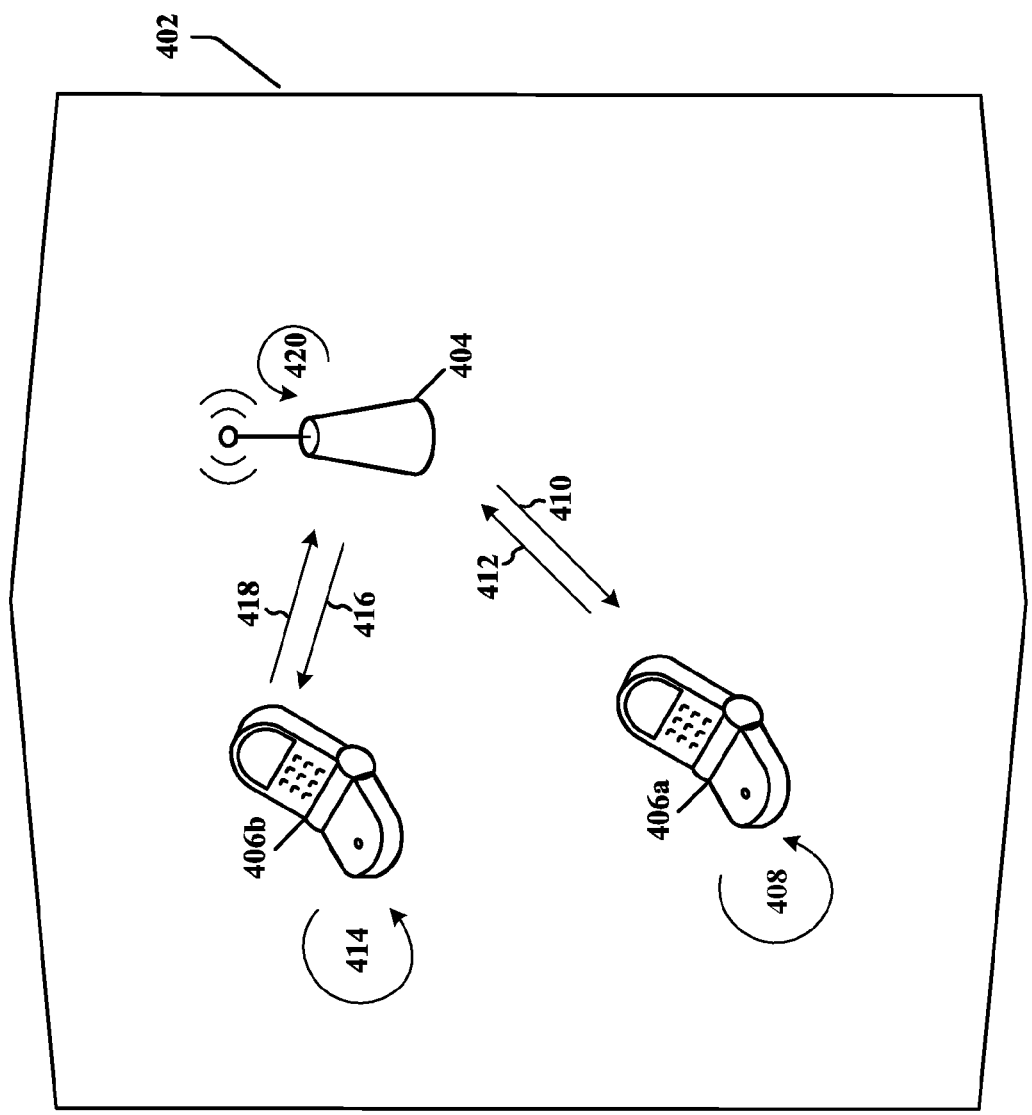
FIG. 4 is a diagram of an aspect of a wireless communications system.

FIG. 4 is a diagram of a wireless communications system 400 that enables single tone uplink transmissions between one or more UEs 406a, 406b and a base station 404 using NB-LTE. As illustrated in FIG. 4, serving cell 402 is the region served by base station 404. The base station 404 may determine 420 a frequency hopping pattern for each of the UEs 406a, 406b to enable single tone uplink transmissions using NB-LTE. Each frequency hopping pattern determined by the base station 404 may be signaled 410, 416 to the respective UE 406a, 406b. In an aspect, one or more of the UEs 406a, 406b may transmit a single tone uplink transmission 412, 418 to the base station 404 based on a respective frequency hopping pattern. The single tone uplink transmission 412, 418 may include one or more of data symbols and/or RS symbols. In an aspect, RS symbol locations may be optimized by error performance. For example, the number of RS symbols may be increased from two per subframe to four per subframe to benefit a small payload transmission or SNR. In an aspect, the single tone uplink transmission coding scheme may be based on at least one of a tail-biting convolutional code (TBCC) or a dual Reed-Muller code.

In an aspect, a frequency hopping pattern may include different tone indices for use by the UEs 406a, 406b in transmitting a plurality of symbols in a single tone uplink transmission. The frequency hopping pattern may indicate that different symbols are transmitted using different tone indices of the single tone uplink transmission. For example, each tone index may be associated with a different frequency, as illustrated in FIGS. 5-7.

Figure 5:
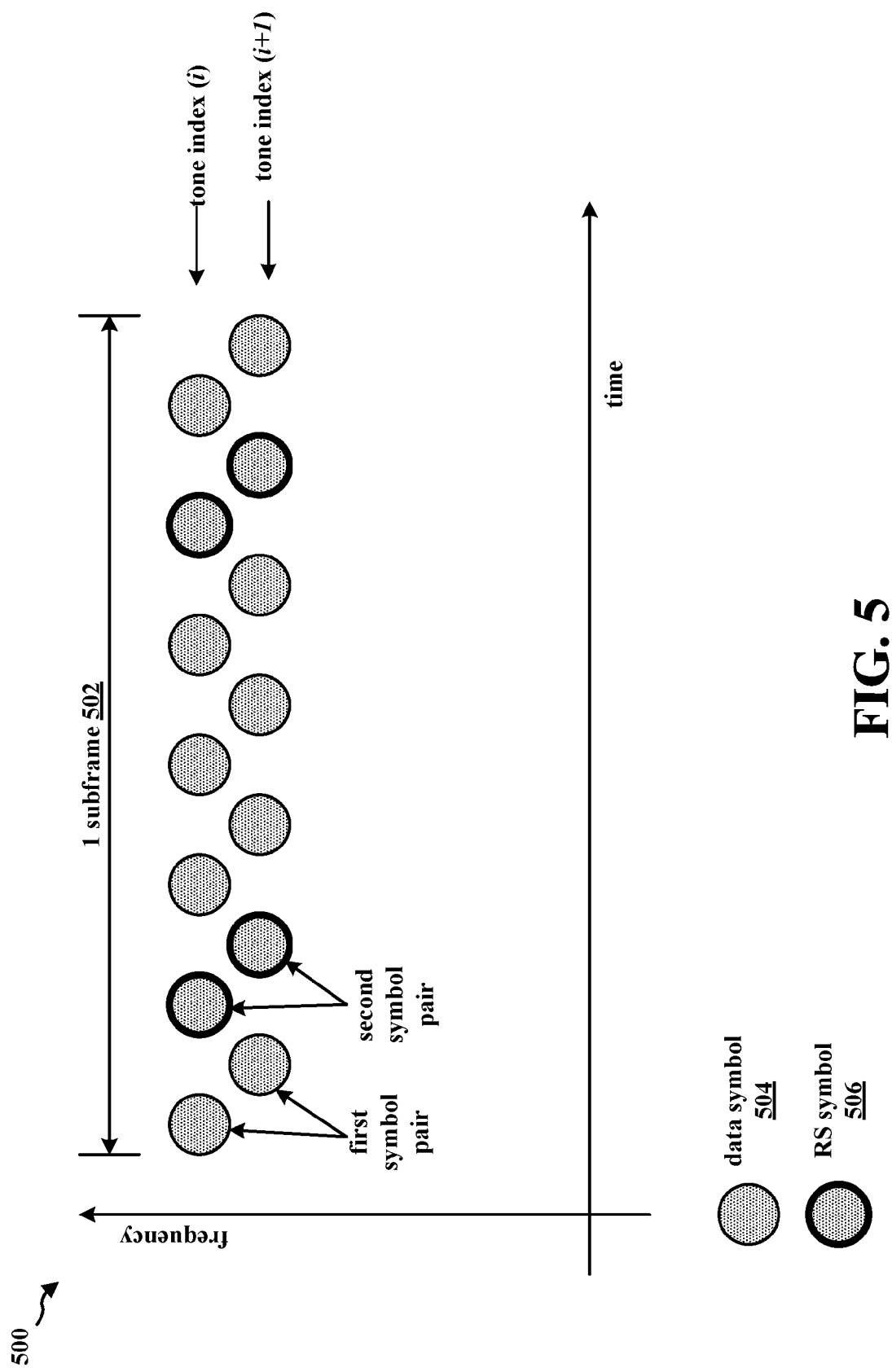
FIG. 5 is a diagram of an aspect of symbols in a wireless communications system.

FIG. 5 illustrates an aspect of a frequency hopping pattern 500 in which groups of symbols are transmitted by a single UE using different tone indices that are separated by a fixed distance. In an aspect, the fixed distance may be the frequency difference between tone index (i) and tone index (i+1). The plurality of symbols may be transmitted in a single subframe 502 and include a plurality of data symbols 504 and reference signal symbols 506. As illustrated in FIG. 5, every other symbol is transmitted using either tone index (i) or tone index (i+1). That is every other symbol "hops" to different tone index.

Figure 6:
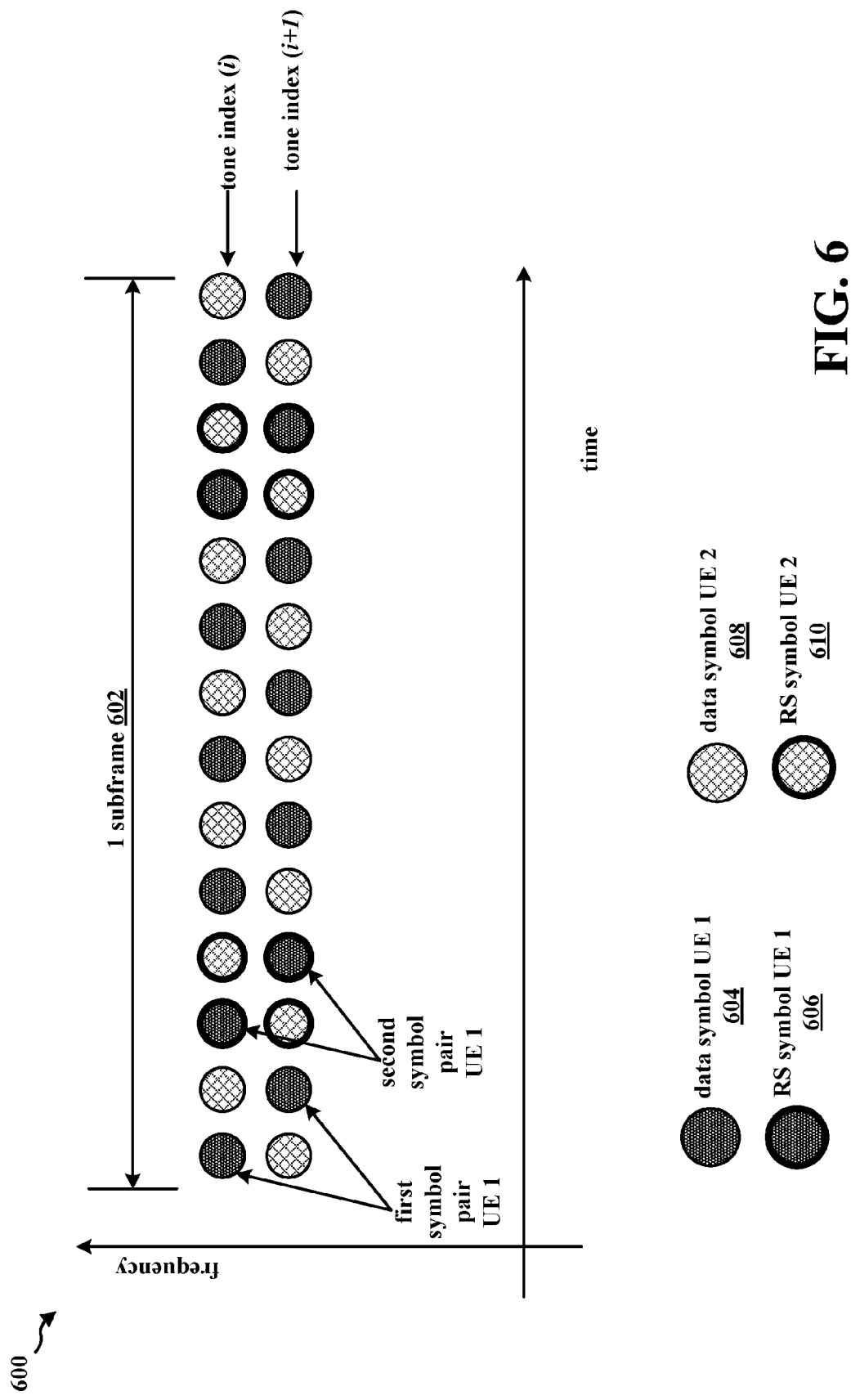
FIG. 6 is a diagram of an aspect of symbols in a wireless communications system.
Figure 7:
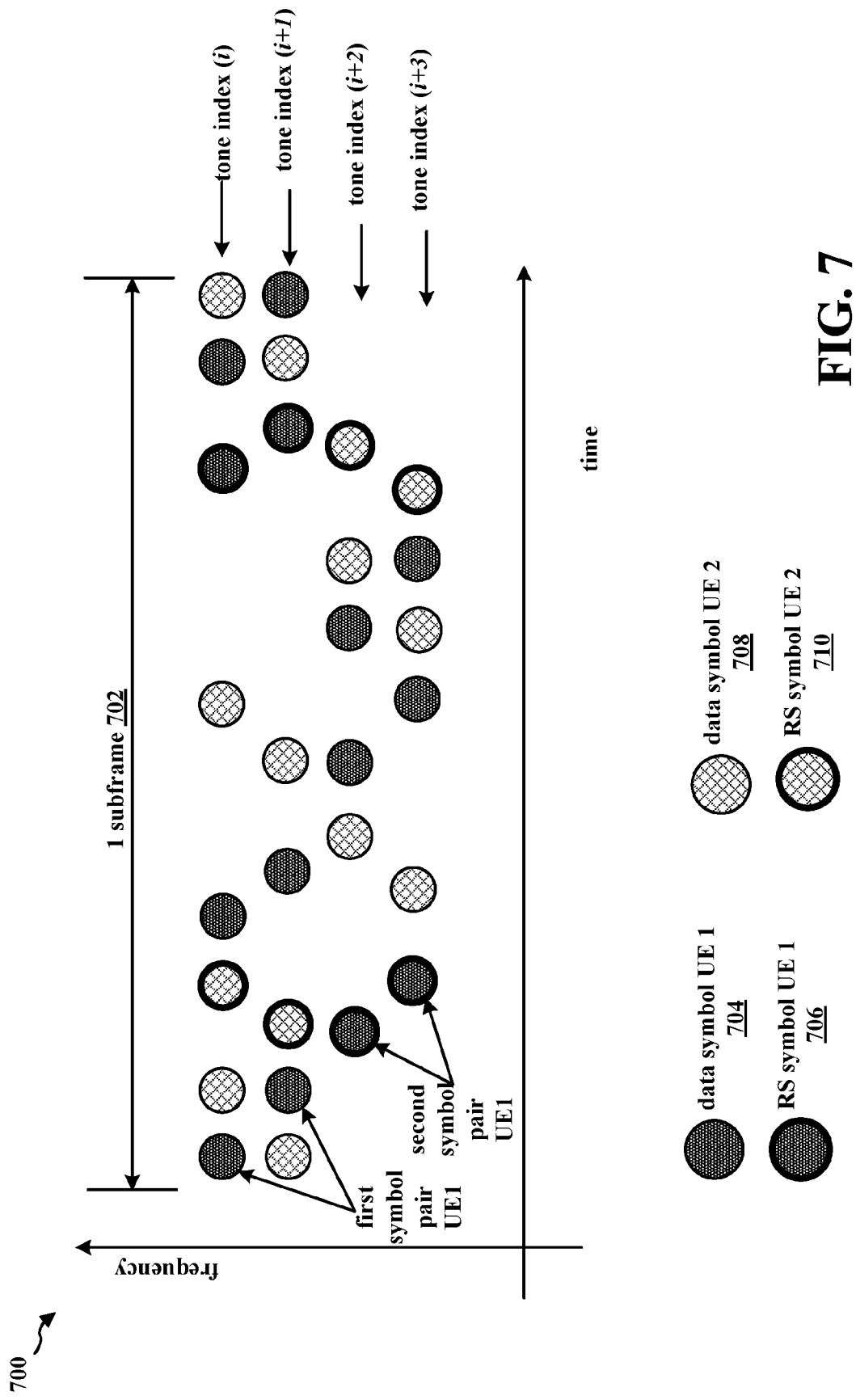
FIG. 7 is a diagram of an aspect of symbols in a wireless communications system.

FIG. 6 illustrates an aspect of a frequency hopping pattern 600 in which groups of symbols transmitted by two UEs are multiplexed using different tone indices that are separated by a fixed distance. In an aspect, the fixed distance may be the frequency difference between tone index (i) and tone index (i+1). The transmissions from the two UEs may be multiplexed in a single subframe 602. For example, the plurality of symbols may include data symbols 604 from UE 1, RS symbols 606 from UE 1, data symbols 608 from UE 2, and RS symbols 610 from UE 2. As illustrated in FIG. 6, every other symbol is transmitted using either tone index (i) or tone index (i+1). That is every other symbol "hops" to a different tone index.

Referring now to FIG. 4, UE 406a (e.g., UE 1) may transmit the plurality of symbols in the single tone uplink transmission by transmitting a first symbol of a first symbol pair using a first tone index (e.g., tone index (i) in FIGS. 5 and 6), and transmitting a second symbol of the first symbol pair using a second tone index that is a fixed frequency difference from the first tone index (e.g., tone index (i+1) in FIGS. 5 and 6). In addition, the UE 406a may transmit the plurality of symbols in the single tone uplink transmission by transmitting a third symbol of a second symbol pair using the first tone index (e.g., tone index (i) in FIGS. 5 and 6), and transmitting a fourth symbol of the second symbol pair using the second tone index (e.g., tone index (i+1) in FIGS. 5 and 6).

Additionally, UE 406b (e.g., UE 2) may transmit the plurality of symbols in the single tone uplink transmission by transmitting a first symbol of a first symbol pair using the second tone index (e.g., tone index (i+1) in FIG. 6), and transmitting a second symbol of the first symbol pair using the first tone index (e.g., tone index (i) in FIG. 6). In addition, the UE 406b may transmit the plurality of symbols in the single tone uplink transmission by transmitting a third symbol of a second symbol pair using the second tone index (e.g., tone index (i+1) in FIGS. 5 and 6), and transmitting a fourth symbol of the second symbol pair using the first tone index (e.g., tone index (i) in FIG. 6). The second index may be a fixed frequency difference from the first tone index, as illustrated in the exemplary aspects depicted in FIGS. 5 and 6.

FIG. 7 illustrates an aspect of a frequency hopping pattern 700 in which symbol pairs transmitted by two UEs are multiplexed using different tone indices that are separated by a non-fixed distance. In an aspect, the non-fixed distance may be a non-fixed frequency difference. The transmissions from the two UEs may be multiplexed in a single subframe 702. For example, the plurality of symbols may include data symbols 704 from UE 1, RS symbols 706 from UE 1, data symbols 708 from UE 2, and RS symbols 710 from UE 2. As illustrated in FIG. 7, each symbol in a symbol pair may be separated by a fixed frequency distance (e.g., tone index (1)). However, an different symbol pair may "hop" to non-fixed tone index that is different from or equal to the fixed frequency distance of the other symbol pair. As also illustrated in FIG. 7, there may be at least one pair of RS symbols transmitted from each UE that occupy the same tone indices as a pair of data symbols transmitted by the same UE.

For example, the first symbol in the first symbol pair from UE 406a (e.g., UE 1) has a tone index of (i) and the second symbol of the first symbol pair from UE 406a has a tone index of (i+1), as illustrated in FIG. 7. However, in contrast to the exemplary aspects illustrated in FIGS. 5 and 6, the first symbol of the second symbol pair from UE 406a "hops" to tone index (i+2) and the second symbol of the second symbol pair from UE 406a "hops" a fixed distance of tone index (1) to tone index (i+3). However, since the frequency difference between symbol pairs in FIG. 7 is non-fixed (e.g., greater than or equal to tone index (1)) the first symbol of the second symbol pair from 406a is not restricted to "hop" to tone index (i+2) and could "hop" to tone index (i+3) instead, for example.

Additionally, the first symbol in the first symbol pair from UE 406b (e.g., UE 2) has a tone index of (i+1) and the second symbol of the first symbol pair from UE 406b has a tone index of (i). As illustrated in FIG. 7, the first symbol of the second symbol pair from UE 406b "hops" to tone index (i+1), and the second symbol of the second symbol pair from UE 406a "hops" a fixed distance of tone index (1) to tone index (i). However, since the frequency difference between different symbol pairs in FIG. 7 is non-fixed (e.g., greater than or equal to tone index (1)) the first symbol of the second symbol pair from 406b is not restricted to "hop" to tone index (i+1) and could "hop" to tone index (i+2) or tone index (i+3), for example. By having a non-fixed frequency distance between different symbol pairs, inter-cell interference may be randomized and may also provide frequency diversity.

Referring again to FIG. 4, the base station 404 may be able to determine 420 a timing estimation for use in communication with the UEs 406a, 406b. The timing estimation may be based on a respective phase difference between the paired symbols received in the single tone uplink transmissions 412, 418. In an aspect, when the frequency offset is small (e.g., 50 Hz) the phase difference caused by phase offset may be ignored by the base station 404 if symbol length is small. Otherwise, the base station 404 may need to estimate the frequency offset. Additionally, the base station 404 may determine a timing offset associated with the UEs 406a, 406b based on a phase difference of RS symbols before a CRC of the single tone data transmission passes. Alternatively, the base station 404 may determine the timing offset of the UEs 406a, 406b based on the data symbols and the RS symbols after the CRC of the single tone data transmission passes with re-encoding and re-modulating the data symbols. The timing estimation may be signaled 47, 416 to the UEs 406a, 406b for use in updating timing at the UEs 406a, 406b.

Referring still to FIG. 4, the single tone uplink transmissions 412, 418 may be transmitted on a PUSCH, PUCCH, or PRACH. For example, if a single tone uplink transmission is transmitted in a PUSCH, the plurality of symbols may include a first number of RS symbols. In an aspect, if a single tone uplink transmission is transmitted on the PUCCH and includes an acknowledgement (ACK), the plurality of symbols may include a second number of RS symbols. Further, if the single tone uplink transmission is transmitted on the PUCCH and includes channel quality information (CQI), the plurality of symbols may include a third number of reference signal (RS) symbols. In a first exemplary aspect, the first number of RS symbols, second number of RS symbols, and third number of RS symbols may be the same. In a second exemplary aspect, at least one of the first number of RS symbols, second number of RS symbols, or third number of RS symbols may be different.

Moreover, if the single tone uplink transmission 412, 418 is transmitted in a PRACH, the UEs 406a, 406b may reduce 408, 414 a tone spacing or a number of the plurality of symbols in each subframe. Additionally, if the single tone uplink transmission 412, 418 is transmitted in a PRACH, the UEs 406a, 406b may transmit the single tone uplink transmissions 412, 418 in an uplink pilot time slot (UpPTS), or in the UpPTS and at least one subsequent uplink subframe. In an aspect, if the radius of serving cell 402 is large there may be a round trip delay between communications of the UEs 406a, 406b and the base station 404.

By way of example, if the radius of serving cell 402 is 7 km the round trip delay may be 64 μs, and if the radius is 35 km the round trip delay may be 233 μs. The CP length may need to be larger than the round trip delay. Thus, the UEs 406a, 406b may need to increase 408, 414 the CP length of the single tone uplink transmission when transmitting in a PRACH.

A first scenario for increasing the CP length may include reducing the number of symbols per subframe but keeping the symbol length the same. For example, assuming a 15 KHz tone spacing, the number of symbols per subframe may be reduced to four, and the CP length increased to 70 μsec. A second scenario for increasing the CP length may include reducing the tone spacing but expanding CP length as well as symbol length. For example, a tone spacing may be reduced by a factor of 6 and the CP length is set at 28 μsec. However, both the first and second scenarios may need to be combined. Here, the UEs 406a, 406b may reduce the tone spacing by a factor of 3, reduce the number of symbols per subframe to 4, and increase CP length to 300 μs in a 3 ms subframe.

In an aspect, the base station 404 may signal to the UEs 406a, 406b information associated with a format for use in transmitting the plurality of symbols in the single tone uplink transmission. For example, the format includes least one of a CP length associated with the plurality of symbols, a symbol duration, or a subframe duration. In addition, the format may be either preamble based without a payload or message based with a payload.

Figure 8:
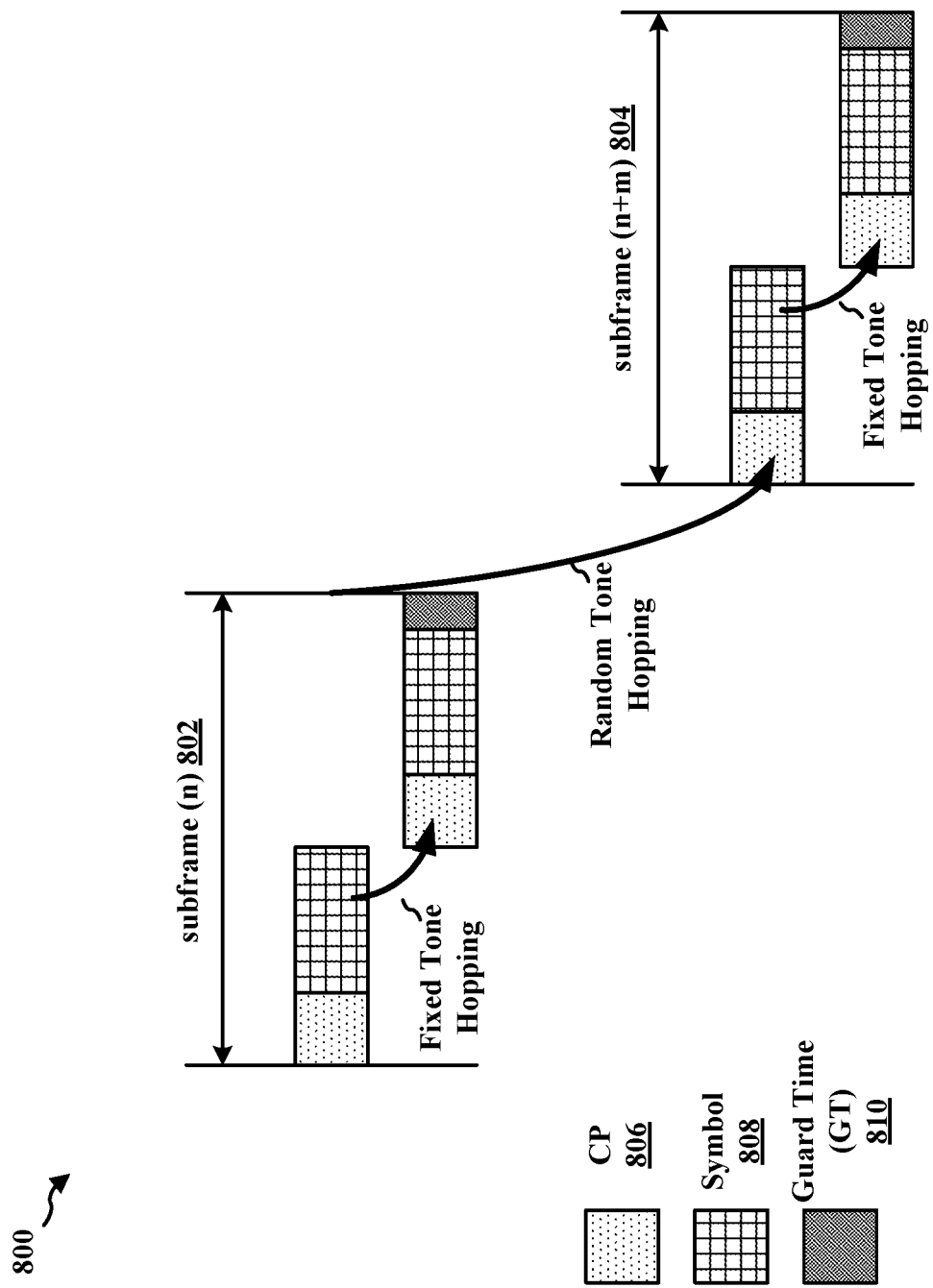
FIG. 8 is a diagram of an aspect of a format used in a wireless communications system.

FIG. 8 illustrates a preamble based format 800 used for transmission of a single tone uplink transmission in a PRACH. For example, the subframe (n) 802 includes two symbols 808 each including a CP 806, and the second symbol including a guard time (GT) 810. The tone hopping within the subframe (n) 802 may be fixed. However, the tone hoping between subframe (n) 802 and subframe (n+m) 804 may be random (e.g., non-fixed). Within subframe (n+m) 804 the tone hopping from the first symbol to the second symbol may also be fixed.

Figure 9:
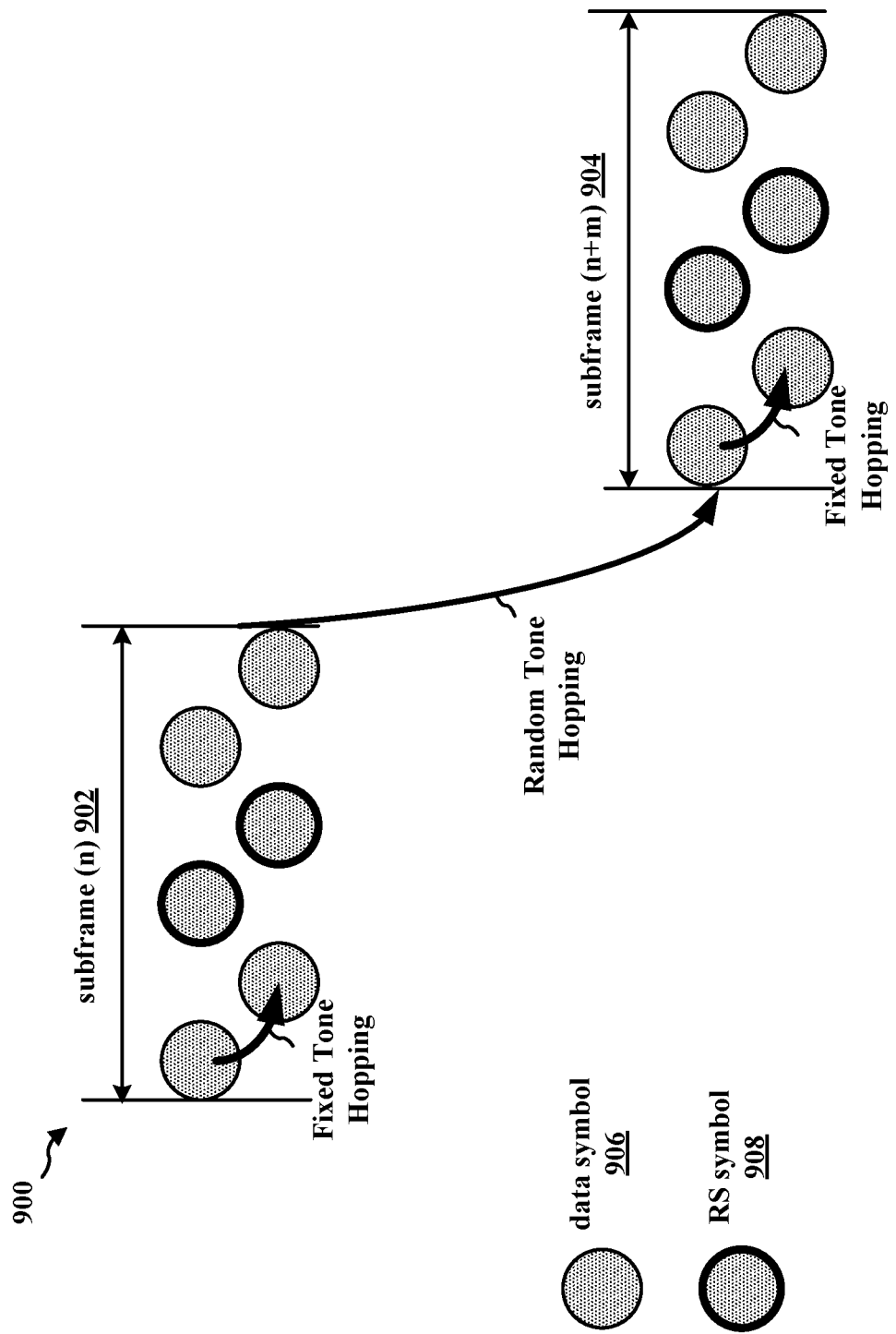
FIG. 9 is a diagram of an aspect of a format used in a wireless communications system.

FIG. 9 illustrates a message based format 900 for use in transmission of a single tone uplink transmission in a PRACH. For example, subframe (n) 902 may include a plurality of data symbols 906 and RS symbols 908. Tone hopping within subframe (n) 902 may be fixed. However, tone hopping from subframe (n) 902 to subframe (n+m) 904 may be random (e.g, non-fixed). Here again, tone hoping within the subframe (n+m) 904 may be fixed.

Figure 10:
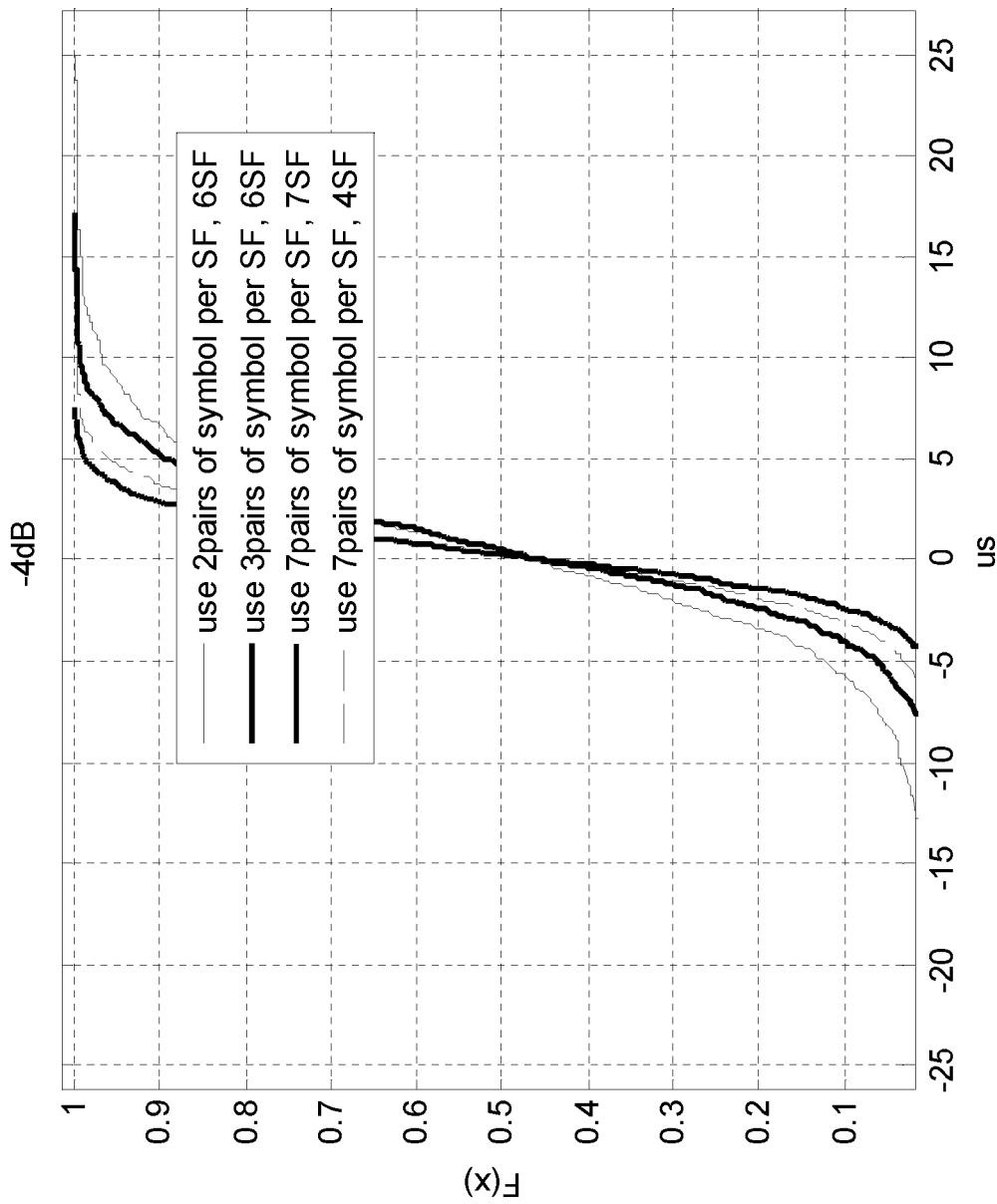
FIG. 10 is a diagram of timing estimation accuracy in a wireless communications system.

FIG. 10 illustrates a graphical depiction of timing estimation accuracy determined using single tone uplink transmissions. Here, the accuracy is illustrated as increasing when an increased number of symbol pairs and the number of subframes are used.

Figure 11:
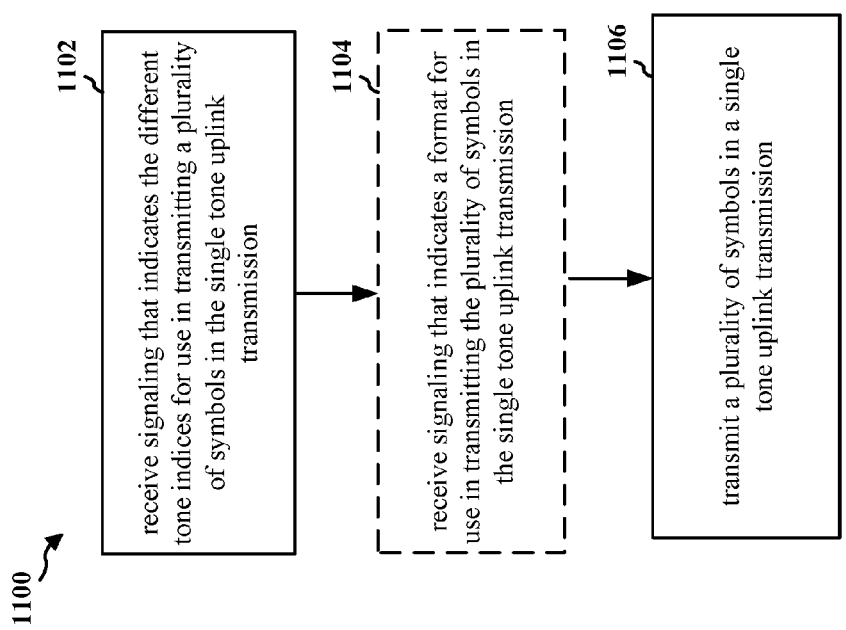
FIG. 11 is a first flowchart of a method of wireless communication.

FIG. 11 is a flowchart 1100 of a method of wireless communication. The method may be performed by a UE, such as one of UEs 406a, 406b illustrated in FIG. 4. It should be understood that the operations indicated with dashed lines represent optional operations for various aspects of the disclosure.

At block 1102, the UE may receive signaling that indicates the different tone indices for use in transmitting a plurality of symbols in a single tone uplink transmission. In an aspect, the different tone indices may indicate a frequency hopping pattern. In the context of FIG. 4, a respective UE 406a, 406b may receive the respective signaling 410, 416 from the base station 404, and each respective signaling 410, 416 may indicate, to the respective UE 406a, 406b, different tone indices for use in a single tone uplink transmission. According to one example, the base station 404 may determine 420 a frequency hopping pattern for each of the UEs 406a, 406b to enable single tone uplink transmissions using NB-LTE. Each frequency hopping pattern determined by the base station 404 may be signaled 410, 416 to the respective UE 406a, 406b.

At block 1104, the UE may receive signaling that indicates a format for use in transmitting the plurality of symbols in the single tone uplink transmission. In an aspect, the format may include least one of a CP length associated with the plurality of symbols, a symbol duration, or a subframe duration. In another aspect, the format is either preamble based without a payload or message based with a payload. For example, referring to FIG. 4, the base station 404 may signal to the UEs 406a, 406b information associated with a format for use in transmitting the plurality of symbols in the single tone uplink transmission. In an exemplary aspect, the signaling received at block 1102 and 1104 may be received contemporaneously.

In one aspect, the format may be according to the preamble based format 800 used for transmission of a single tone uplink transmission in a PRACH, as illustrated at FIG. 8. In another aspect, the format may be according to the message based format 900 for use in transmission of a single tone uplink transmission in a PRACH, as illustrated at FIG. 9.

At block 1106, the UE may transmit a plurality of symbols in a single tone uplink transmission. In an aspect, pairs of symbols in the plurality of symbols may be transmitted using different tone indices of the single tone uplink transmission. In an aspect, each tone index of the different tone indices is associated with a different frequency. In an aspect, the plurality of symbols comprises at least one of data symbols or RS symbols. The UE may determine the different tone indices based on the signaling from the base station that indicates the different tone indices.

In an exemplary aspect, the UE may transmit the plurality of symbols in the single tone uplink transmission by transmitting a first symbol of a first symbol pair using a first tone index, and transmitting a second symbol of the first symbol pair using a second tone index that is a fixed frequency difference from the first tone index. For example, referring to FIGS. 4-6, UE 406a (e.g., UE 1) may transmit the plurality of symbols in the single tone uplink transmission by transmitting a first symbol of a first symbol pair using a first tone index (e.g., tone index (i) in FIGS. 5 and 6), and transmitting a second symbol of the first symbol pair using a second tone index that is a fixed frequency difference from the first tone index (e.g., tone index (i+1) in FIGS. 5 and 6).

In another exemplary aspect, the UE may transmit the plurality of symbols in the single tone uplink transmission by transmitting a third symbol of a second symbol pair using the first tone index, and transmitting a fourth symbol of the second symbol pair using the second tone index that is the fixed frequency difference from the first tone index. For example, referring to FIGS. 4-6, the UE 406a may transmit the plurality of symbols in the single tone uplink transmission by transmitting a third symbol of a second symbol pair using the first tone index (e.g., tone index (i) in FIGS. 5 and 6), and transmitting a fourth symbol of the second symbol pair using the second tone index (e.g., tone index (i+1) in FIGS. 5 and 6).

In another exemplary aspect, the UE may transmit the plurality of symbols in the single tone uplink transmission by transmitting a third symbol of a second symbol pair using a third tone index that is a non-fixed frequency difference with respect to the second tone index, and transmitting a fourth symbol of the second symbol pair using a fourth tone index that is a fixed frequency difference from the third tone index. For example, referring to FIG. 7, the first symbol of the second symbol pair from UE 406a "hops" to tone index (i+2), and the second symbol of the second symbol pair from UE 406a "hops" a fixed distance of tone index (1) to tone index (i+3). However, since the frequency difference between symbol pairs in FIG. 7 is non-fixed (e.g., greater than or equal to tone index (1)) the first symbol of the second symbol pair from 406a is not restricted to "hop" to tone index (i+2) and could "hop" to tone index (i+3) instead, for example.

In another aspect, the UE may transmit the plurality of symbols in the single tone uplink transmission by transmitting at least one pair of data symbols in a subframe using the different tone indices, and transmitting at least one pair of RS symbols in the subframe using the different tone indices.

In an aspect, if the single tone uplink transmission is transmitted in a PUSCH, the plurality of symbols may include a first number of RS symbols. In another aspect, if the single tone uplink transmission includes an ACK, the plurality of symbols may include a second number of reference signal RS symbols. In a further aspect, if the single tone uplink transmission includes channel quality information CQI, the plurality of symbols includes a third number of RS symbols. In yet a further aspect, the first number of RS symbols, second number of RS symbols, and third number of RS symbols may be the same. Moreover, at least one of the first number of RS symbols, second number of RS symbols, and third number of RS symbols may be different.

In one aspect, if the single tone uplink transmission is transmitted in a PRACH, the UE may reduce a tone spacing, and/or reduce a number of the plurality of symbols in each subframe.

In addition, if the single tone uplink transmission is transmitted in a PRACH, the UE may transmit the single tone uplink transmission in an UpPTS, and/or transmit the single tone uplink transmission in the UpPTS and at least one subsequent uplink subframe.

In another aspect, the single tone uplink transmission coding scheme may be based on at least one of a tail-biting convolutional code (TBCC) or a dual Reed-Muller code.

Figure 12:
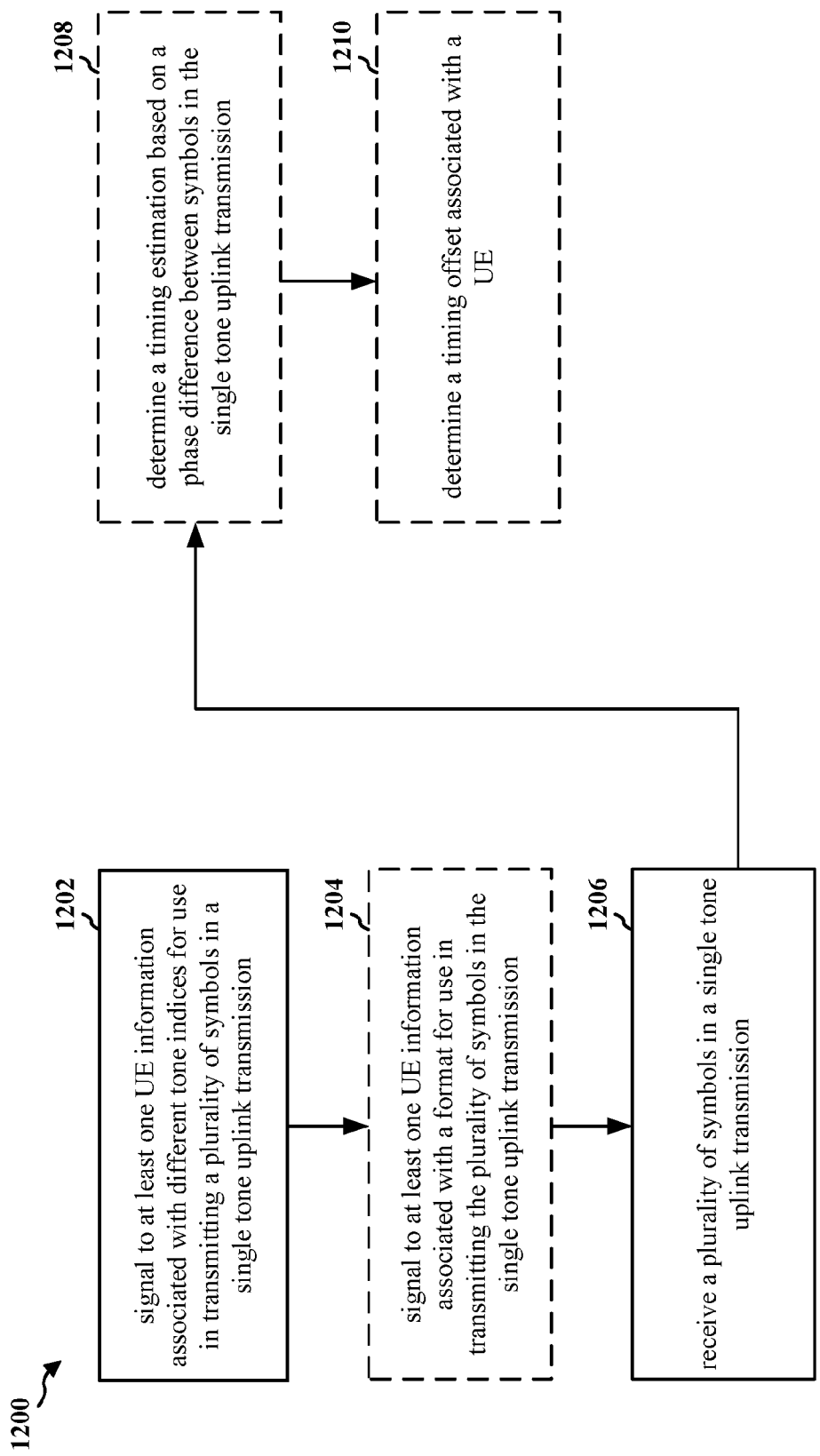
FIG. 12 is a second flowchart of a method of wireless communication.

FIG. 12 is a flowchart 1200 of a method of wireless communication. The method may be performed by a base station, such as base station 404 illustrated in FIG. 4. It should be understood that the operations indicated with dashed lines represent optional operations for various aspects of the disclosure.

At block 1202, the base station may signal, to at least one UE, information associated with the different tone indices for use in transmitting the plurality of symbols in the single tone uplink transmission. In an aspect, the base station may determine the information associated with the different tone indices. In an aspect, the different tone indices may indicate a frequency hopping pattern. Accordingly, the base station may determine the frequency hopping pattern to be used for the at least one UE.

In the context of FIG. 4, the base station 404 may determine 420 a frequency hopping pattern for each of the UEs 406a, 406b to enable single tone uplink transmissions using NB-LTE. Each frequency hopping pattern determined by the base station 404 may be signaled 410, 416 to the respective UE 406a, 406b.

At block 1204, the base station may signaling to at least one UE information associated with a format for use in transmitting the plurality of symbols in the single tone uplink transmission. In an aspect, the base station may determine, for the at least one UE, the information associated with the format for use in transmitting the plurality of symbols in the single tone uplink transmission. In an aspect, the format may include least one of a CP length associated with the plurality of symbols, a symbol duration, or a subframe duration. In an aspect, the format is either preamble based without a payload or message based with a payload.

Referring to FIG. 4, the base station 404 may signal to the UEs 406a, 406b information associated with a format for use in transmitting the plurality of symbols in the single tone uplink transmission. In an exemplary aspect, the signaling received at block 1202 and 1204 may be signaled contemporaneously. In an aspect, the base station 404 may determine a format for use in transmitting the plurality of symbols in the single tone uplink transmission. In an aspect, the base station 404 may determine a first format for a first UE 406a and a different format for a second UE 406b.

In one aspect, the format may be according to the preamble based format 800 used for transmission of a single tone uplink transmission in a PRACH, as illustrated at FIG. 8. In another aspect, the format may be according to the message based format 900 for use in transmission of a single tone uplink transmission in a PRACH, as illustrated at FIG. 9.

At block 1206, the base station may receive a plurality of symbols in a single tone uplink transmission. In an aspect, different symbols in the plurality of symbols may be received in different tone indices of the single tone uplink transmission. In an aspect, each tone index of the different tone indices is associated with a different frequency. In an aspect, the plurality of symbols comprises a first set of symbols from a UE and a second set of symbols from a second UE, and the plurality of symbols comprises at least one of data symbols or RS symbols. In an aspect, the single tone uplink transmission coding scheme is based on at least one of a TBCC or a dual Reed-Muller code. With reference to FIG. 4, the base station 404 may receive, from a first UE 406a, a single tone uplink transmission 412 that includes a plurality of symbols. In an aspect, pairs of symbols in the plurality of symbols are received in the single tone uplink transmission 412 in different tone indices as indicated in the information in the signaling 410 to the first UE 406a.

In one exemplary aspect, the base station may receive the plurality of symbols in the single tone uplink transmission by receiving a first symbol of a first symbol pair in a first tone index, and receiving a second symbol of the first symbol pair in a second tone index that is a fixed frequency difference from the first tone index. For example, referring to FIGS. 4-6, the base station 404 may receive, from a first UE 406a (e.g., UE 1), the plurality of symbols in the single tone uplink transmission by receiving a first symbol of a first symbol pair using a first tone index (e.g., tone index (i) in FIGS. 5 and 6), and receiving a second symbol of the first symbol pair using a second tone index that is a fixed frequency difference from the first tone index (e.g., tone index (i+1) in FIGS. 5 and 6).

In another exemplary aspect, the base station may receive the plurality of symbols in the single tone uplink transmission by receiving a third symbol of a second symbol pair in the first tone index, and receiving a fourth symbol of the second symbol pair in the second tone index that is the fixed frequency difference from the first tone index. For example, referring to FIGS. 4-6, the base station 404 may receive, from a first UE 406a, the plurality of symbols in the single tone uplink transmission by receiving a third symbol of a second symbol pair using the first tone index (e.g., tone index (i) in FIGS. 5 and 6), and receiving a fourth symbol of the second symbol pair using the second tone index (e.g., tone index (i+1) in FIGS. 5 and 6).

In yet another exemplary aspect, the base station may receive the plurality of symbols in the single tone uplink transmission by receiving a third symbol of a second symbol pair in a third tone index that is a non-fixed frequency difference with respect to the second tone index, receiving a fourth symbol of the second symbol pair in a fourth tone index that is a fixed frequency difference with respect to the third tone index. For example, referring to FIG. 7, the first symbol of the second symbol pair from UE 406a "hops" to tone index (i+2), and the second symbol of the second symbol pair from UE 406a "hops" a fixed distance of tone index (1) to tone index (i+3). However, since the frequency difference between different symbol pairs in FIG. 7 is non-fixed (e.g., greater than or equal to tone index (1)) the first symbol of the second symbol pair from 406a is not restricted to "hop" to tone index (i+2) and could "hop" to tone index (i+3) instead, for example.

In an aspect, the base station may receive the plurality of symbols in the single tone uplink transmission by receiving at least one pair of data symbols in a subframe in the different tone indices, and receiving at least one pair of RS symbols in the subframe in the different tone indices In an aspect, if the single tone uplink transmission is received in a PUSCH, the plurality of symbols includes a first number of RS symbols. In a further aspect, if the single tone uplink transmission includes an ACK, the plurality of symbols includes a second number of RS symbols. In yet another aspect, if the single tone uplink transmission includes CQI, the plurality of symbols includes a third number of RS symbols. In addition, the first number of RS symbols, second number of RS symbols, and third number of RS symbols may be the same, or at least one of the first number of RS symbols, second number of RS symbols, and third number of RS symbols are different.

Moreover, if the single tone uplink transmission is received in a PRACH, the base station may receive the single tone uplink transmission in an UpPTS, or receive the single tone uplink transmission in the UpPTS and at least one subsequent uplink subframe.

Additionally, if the single tone uplink transmission is received in a PRACH, the single tone uplink transmission includes at least one of a reduced tone spacing or a reduced number of the plurality of symbols in each subframe.

At block 1208, the base station may determine a timing estimation based on a phase difference between the different symbols. For example, referring to FIG. 4, the base station 404 may be able to determine 420 a timing estimation for use in communication with the UEs 406a, 406b. A respective timing estimation may be based on a respective phase difference between the symbol pairs with fixed tone distance received in the respective single tone uplink transmissions 412, 418. In an aspect, when the frequency offset is small (e.g., 50 Hz) the phase difference caused by phase offset may be ignored by the base station 404 if symbol length is small. Otherwise, the base station 404 may estimate the frequency offset.

At block 1210, the base station may determine a timing offset associated with a UE. In an aspect, the base station may determine the timing offset based on a phase difference of RS symbols in the plurality of symbols before a CRC of the single tone data transmission passes. In another aspect, the base station may determine the timing offset based on the data symbols and the RS symbols after the CRC of the single tone data transmission passes with re-encode and re-modulating the data symbols. With reference to FIG. 4, the base station 404 may determine a respective timing offset associated with a respective UE 406a, 406b, for example, based on a phase difference of RS symbols in the plurality of symbols before a CRC of a respective single tone data transmission 412, 418 passes.

Figure 13:
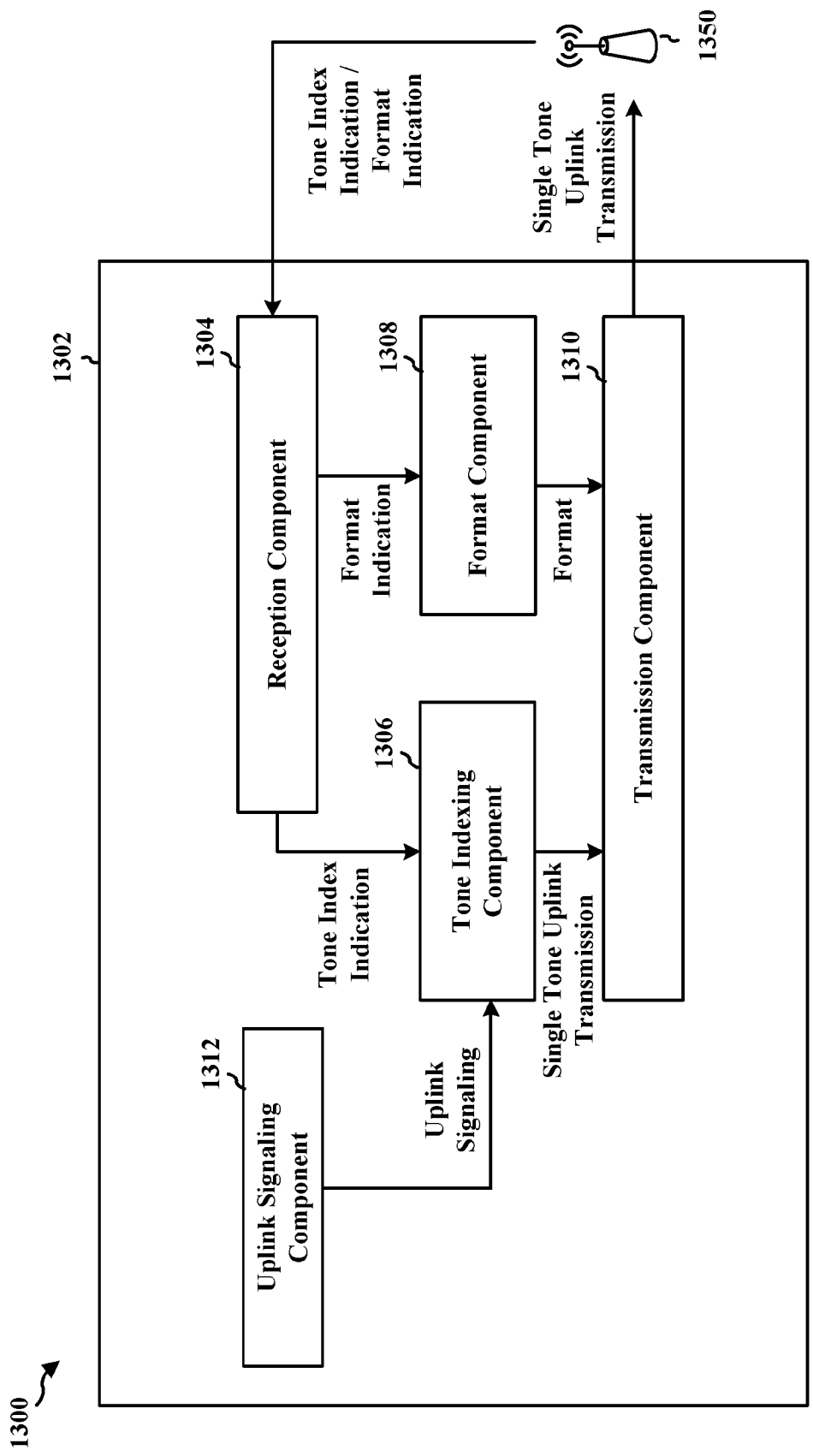
FIG. 13 is a conceptual data flow diagram illustrating the data flow between different means/components in an exemplary apparatus.

FIG. 13 is a conceptual data flow diagram 1300 illustrating the data flow between different means/components in an exemplary apparatus 1302. The apparatus 1302 may be a UE. The apparatus includes a reception component 1304 configured to receive signals from a base station 1350. The apparatus may further include a transmission component 1310 configured to transmit signals to the base station 1350.

In an aspect, the apparatus 1302 may include an uplink signaling component 1312 configured to determine (e.g., generate) uplink signaling to be transmitted to the base station 1350. For example, the uplink signaling component 1312 may configured to determine uplink data and/or an RS that is to be transmitted to the base station 1350, such as data associated with CIoT communications. The uplink signaling component 1312 may provide this uplink signaling (e.g., data and/or RS) to the transmission component 1310.

In an aspect, the apparatus 1302 may further include a tone indexing component 1306. In an aspect, the tone indexing component 1306 may be configured to receive, through the reception component 1304, signaling from the base station 1350 that indicates different tone indices. The tone indexing component 1306 may be configured to determine different tone indices indicated by the received signaling. For example, the tone indexing component 1306 may be configured to determine a frequency hopping pattern based on the signaling from the base station 1350.

In an aspect, the tone indexing component 1306 may be configured to determine a plurality of symbols for transmission of the uplink signaling in a single tone uplink transmission. In an aspect, the tone indexing component 1306 may be configured to determine groups of symbols in the plurality of symbols using the different tone indices. In an aspect, each tone index of the different tone indices is associated with a different frequency.

In an aspect, the tone indexing component 1306 may be configured to determine a first symbol of a first symbol pair using a first tone index and, further, determine a second symbol of the first symbol pair using a second tone index that is a fixed frequency from the first tone index, for example, according to a frequency hopping pattern determined by the tone indexing component 1306 based on the signaling received from the base station 1350.

In an aspect, the tone indexing component 1306 may be configured to determine a third symbol of a second symbol pair using the first tone index and, further, determine a fourth symbol of the second symbol pair using the second tone index that is a fixed frequency from the first tone index, for example, according to a frequency hopping pattern determined by the tone indexing component 1306 based on the signaling received from the base station 1350.

In another aspect, the tone indexing component 1306 may be configured to determine a third symbol of a second symbol pair using a third tone index that is a non-fixed frequency difference with respect to the second tone index. The tone indexing component 1306 may be further configured to determine a fourth symbol of the second symbol pair using a fourth tone index that is a fixed frequency from the third tone index, for example, according to a frequency hopping pattern determined by the tone indexing component 1306 based on the signaling received from the base station 1350.

In an aspect, the tone indexing component 1306 may be configured to determine, using the different tone indices, at least one pair of data symbols for a subframe. Further, the tone indexing component 1306 may be configured to determine, using the different tone indices, at least one pair of RS symbols in that subframe.

In an aspect, the tone indexing component 1306 may be configured to determine a first number of RS symbols if the uplink signaling from the uplink signaling component 1312 is to be transmitted in a PUSCH. In an aspect, the tone indexing component 1306 may be configured to determine a second number of RS symbols if the uplink signaling from the uplink signaling component 1312 is to include an ACK. In an aspect, the tone indexing component 1306 may be configured to determine a third number of RS symbols if the uplink signaling from the uplink signaling component 1312 is to include CQI. In an aspect, the first, second, and third number of RS symbols are the same. In another aspect, at least one of the first, second, or third number of RS symbols may be different.

In an aspect, the tone indexing component 1306 may be configured to reduce tone spacing of the uplink signaling if the uplink signaling from the uplink signaling component 1312 is to be transmitted in PRACH. In another aspect, the tone indexing component 1306 may be configured to reduce a number of a plurality of symbols in each subframe for the uplink signaling if the uplink signaling from the uplink signaling component 1312 is to be transmitted in PRACH.

In an aspect, the tone indexing component 1306 may be configured to determine an UpPTS for the uplink signaling if the uplink signaling from the uplink signaling component 1312 is to be transmitted in PRACH. In another aspect, the tone indexing component 1306 may be configured to determine an UpPTS and at least one subsequent uplink subframe for the uplink signaling if the uplink signaling from the uplink signaling component 1312 is to be transmitted in PRACH.

In an aspect, the tone indexing component 1306 may be configured to apply a coding scheme to the uplink signaling from the uplink signaling component 1312. In an aspect, the coding scheme may be based on at least one of a tail-biting convolutional coding (TBCC) or a dual Reed-Muller code.

In an aspect, the tone indexing component 1306 may be configured to provide the single tone uplink transmission having the plurality of symbols to the transmission component 1310.

The apparatus 1302 may further include a format component 1308. In an aspect, the format component 1308 may be configured to receive, through the reception component 1304, an indication of a format for use in transmitting the plurality of symbols in the single tone uplink transmission. In an aspect, the format component 1308 may be configured to determine a format that includes at least one of a CP length associated with the plurality of symbols, a symbol duration, or a subframe duration, for example, based on signaling received from the base station 1350. In an aspect, the format may be either preamble based without a payload or message based with a payload. The format component 1308 may provide this format to the transmission component 1310.

The transmission component 1310 may be configured to transmit the plurality of symbols in the single tone uplink transmission from the tone indexing component 1306. In accordance with the single tone uplink transmission provided by the tone indexing component 1306, groups of symbols in the plurality of symbols may be transmitted in the single tone uplink transmission using the different tone indices determined by the tone indexing component 1306. In transmission of the signal tone uplink transmission, the transmission component 1310 may be configured to use the format provided by the format component 1308.

The apparatus 1302 may include additional components that perform each of the blocks of the algorithm in the aforementioned flowchart of FIG. 11. As such, each block in the aforementioned flowcharts of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
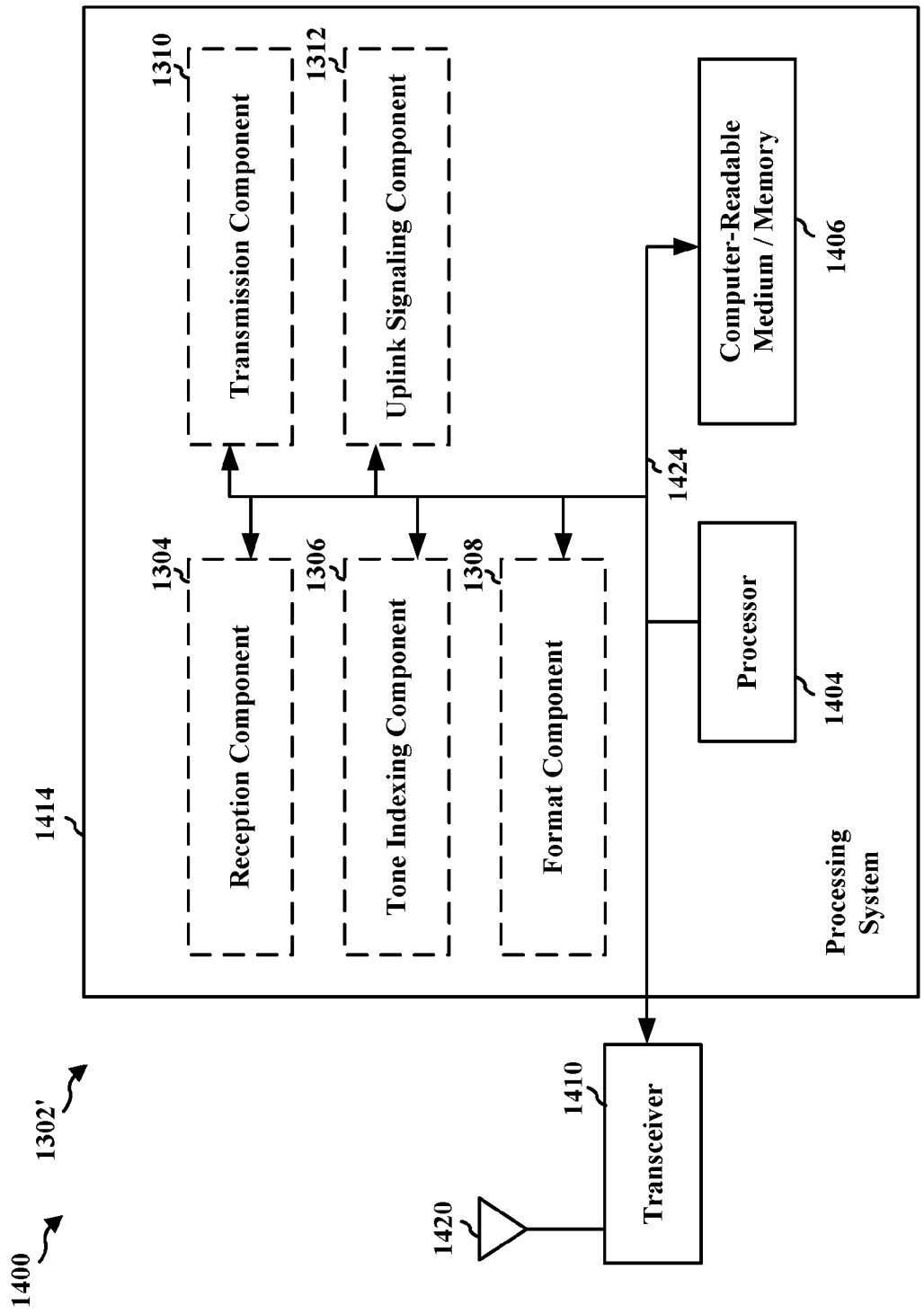
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1310, 1312, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1310, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1310, 1312. The components may be software components running in the processor 1404, resident/stored in the computer readable medium/memory 1406, one or more hardware components coupled to the processor 1404, or some combination thereof. The processing system 1414 may be a component of the UE 350 and may include the memory 360 and/or at least one of the TX processor 368, the RX processor 356, and the controller/processor 359.

In one configuration, the apparatus 1302/1302' for wireless communication includes means for receiving signaling from a base station that indicates different tone indices. The apparatus 1302/1302' may further include means for transmitting a plurality of symbols in a single tone uplink transmission. In an aspect, groups of symbols in the plurality of symbols are transmitted in the single tone uplink transmission using the different tone indices indicated by the received signaling. In an aspect, each tone index of the different tone indices is associated with a different frequency. In an aspect, the plurality of symbols comprises at least one of data symbols or RS symbols.

In an aspect, the means for transmitting the plurality of symbols in the single tone uplink transmission is configured to transmit a first symbol of a first symbol pair using a first tone index and transmit a second symbol of the first symbol pair using a second tone index that is a fixed frequency difference from the first tone index.

In an aspect, the means for transmitting the plurality of symbols in the single tone uplink transmission is configured to transmit a third symbol of a second symbol pair using the first tone index and transmit a fourth symbol of the second symbol pair using the second tone index that is the fixed frequency difference from the first tone index. In an aspect, the means for transmitting the plurality of symbols in the single tone uplink transmission is configured to transmit a third symbol of a second symbol pair using a third tone index that is a non-fixed frequency difference with respect to the second tone index and transmit a fourth symbol of the second symbol pair using a fourth tone index that is a fixed frequency difference from the third tone index. In an aspect, the different tone indices of the received signaling indicate a frequency hopping pattern.

In an aspect, the means for transmitting the plurality of symbols in the single tone uplink transmission is configured to transmit at least one pair of data symbols in a subframe using the different tone indices and transmit at least one pair of RS symbols in the subframe using the different tone indices.

In an aspect, if the single tone uplink transmission is transmitted in a PUSCH, the plurality of symbols includes a first number of reference signal (RS) symbols. In an aspect, if the single tone uplink transmission includes an ACK, the plurality of symbols includes a second number of RS symbols. In an aspect, if the single tone uplink transmission includes CQI, the plurality of symbols includes a third number of RS symbols. In an aspect, the first number of RS symbols, second number of RS symbols, and third number of RS symbols are the same; or at least one of the first number of RS symbols, second number of RS symbols, and third number of RS symbols are different.

In an aspect, if the single tone uplink transmission is transmitted in a PRACH, the apparatus 1302/1302' further includes at least one of means for reducing a tone spacing or means for reducing a number of the plurality of symbols in each subframe.

In an aspect, the apparatus 1302/1302' further includes means for receiving signaling from a base station that indicates a format for use in transmitting the plurality of symbols in the single tone uplink transmission. In an aspect, the format includes least one of a CP length associated with the plurality of symbols, a symbol duration, or a subframe duration. In an aspect, the format is either preamble based without a payload or message based with a payload.

In an aspect, if the single tone uplink transmission is transmitted in a PRACH, means for transmitting the plurality of symbols in the single tone uplink transmission is configured to transmit the single tone uplink transmission in an UpPTS or transmit the single tone uplink transmission in the UpPTS and at least one subsequent uplink subframe. In an aspect, a coding scheme of the single tone uplink transmission is based on at least one of a tail-biting convolutional code (TBCC) or a dual Reed-Muller code.

The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 15:
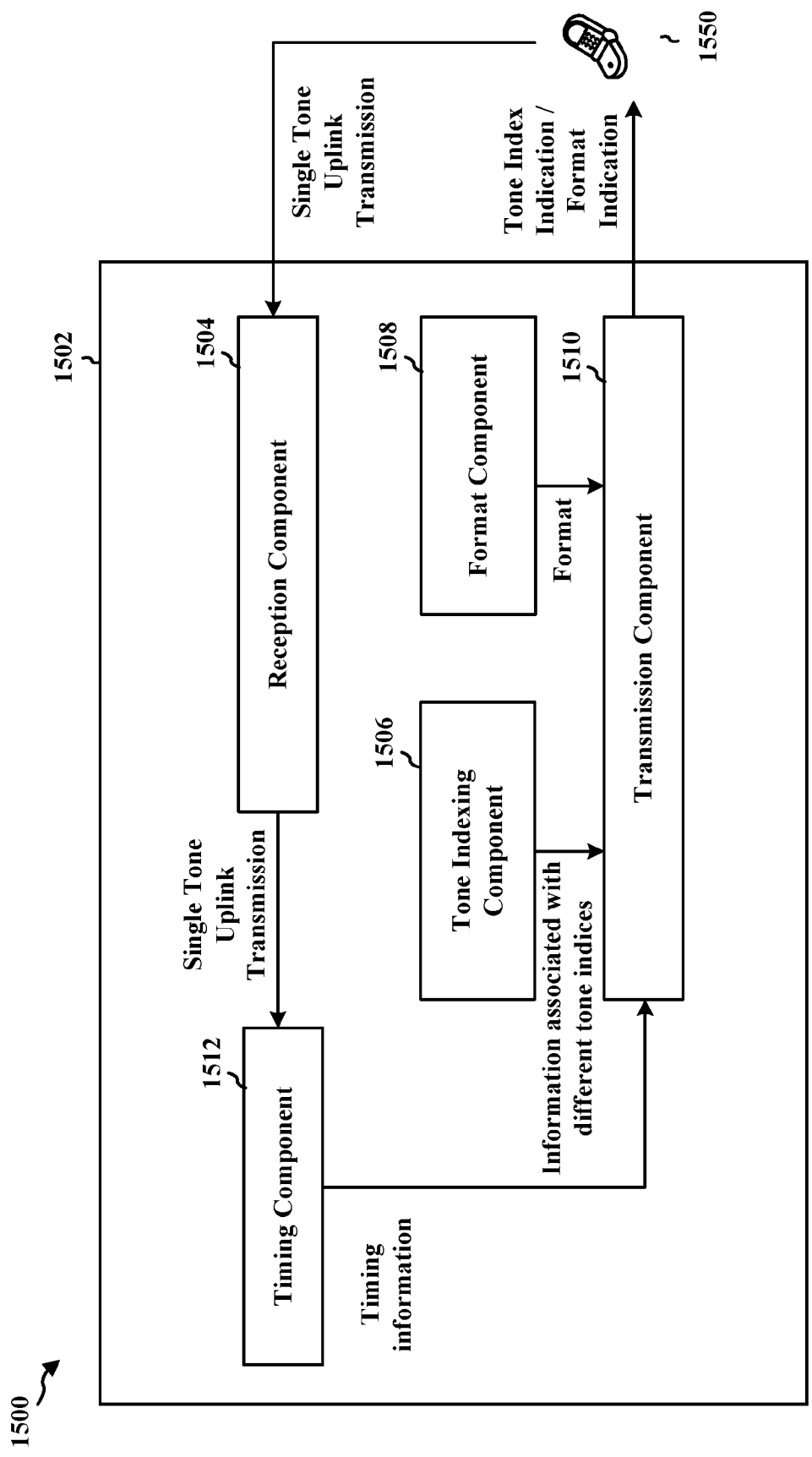
FIG. 15 is a conceptual data flow diagram illustrating the data flow between different means/components in an exemplary apparatus.

FIG. 15 is a conceptual data flow diagram 1500 illustrating the data flow between different means/components in an exemplary apparatus 1502. The apparatus 1502 may be a base station (e.g., an eNB). The apparatus 1502 includes a reception component 1504 configured to send signals to a UE 1550. The apparatus 1502 further includes a transmission component 1510 configured to send signals to a UE 1550.

In an aspect, the apparatus 1502 includes a tone indexing component 1506. In an aspect, the tone indexing component 1506 is configured to determine information indicating different indices for use in transmitting in a plurality of signals in a single tone uplink transmission. In an aspect, the information associated with the different tone indices indicates a frequency hopping pattern. In an aspect, the tone indexing component 1506 may provide this information to the transmission component 1510 for transmission to the UE 1550.

The apparatus 1502 may further include a format component 1508. In an aspect, the format component 1508 may be configured to determine a format for use in transmitting the plurality of symbols in the single tone uplink transmission. In an aspect, the format component 1508 may be configured to determine a format that includes at least one of a CP length associated with the plurality of symbols, a symbol duration, or a subframe duration. In an aspect, the format component 1508 may determine the format to be either preamble based without a payload or message based with a payload. The format component 1508 may provide this format to the transmission component 1510. The transmission component 1510 may transmit an indication of this format to the UE 1550.

The reception component 1504 may be configured to receive a single tone uplink transmission from the UE 1550, for example, based on the information associated with the different tone indices and/or the indication of the format. In an aspect, the single tone uplink transmission may include a plurality of symbols, and pairs of symbols in the plurality of symbols may be received in different tone indices of the single tone uplink transmission. In an aspect, the reception component 1504 may provide this single tone uplink transmission to a timing component 1512.

The timing component 1512 may be configured to determine information associated with pairs of symbols, such as indices of pairs of symbols. In an aspect, the timing component 1512 may determine that the plurality of symbols includes a first set of symbols from the UE 1550 and a second set of symbols from another UE. The timing component 1512 may determine that the plurality of symbols includes at least one of data symbols or RS symbols.

In an aspect, the timing component 1512 may determine that the plurality of symbols in the single tone uplink transmission includes a first symbol of a first symbol pair in a first tone index and a second symbol of the first symbol pair in a second tone index that is a fixed frequency difference from the first tone index.

In an aspect, the timing component 1512 may determine that the plurality of symbols in the single tone uplink transmission includes a third symbol of a second symbol pair in the first tone index and a fourth symbol of the second symbol pair in the second tone index that is a fixed frequency difference from the first tone index.

In another aspect, the timing component 1512 may determine that the plurality of symbols in the single tone uplink transmission includes a third symbol of a second symbol pair in a third tone index that is a non-fixed frequency difference with respect to the second tone index. The timing component 1512 may further determine that the plurality of symbols in the single tone uplink transmission includes a fourth symbol of the second symbol pair in a fourth tone index that is a fixed frequency difference with respect to the third tone index.

In an aspect, the timing component 1512 may determine that the plurality of symbols in the single tone uplink transmission includes at least one pair of data symbols in a subframe in the different tone indices. The timing component 1512 may further determine that the plurality of symbols in the single tone uplink transmission includes at least one pair of RS symbols in the subframe in the different tone indices.

In an aspect, the timing component 1512 may determine that the plurality of symbols includes a first number of RS symbols when the single tone uplink transmission is received in a PUSCH. In an aspect, the timing component 1512 may determine that the plurality of symbols includes a second number of RS symbols when the single tone uplink transmission includes an ACK. In an aspect, the timing component 1512 may determine that the plurality of symbols includes a third number of RS symbols if the single tone uplink transmission includes CQI. In an aspect, the first, second, and third numbers of RS symbols may be the same. In another aspect, at least one of the first, second, or third number off RS symbols are different.

In an aspect, the timing component 1512 may be configured to determine that the single tone uplink transmission includes at least one of a reduced tone spacing or a reduced number of the plurality of symbols in each subframe when the single tone uplink transmission is received in a PRACH.

In an aspect, the timing component 1512 may be configured to determine that the single tone uplink transmission is received in an UpPTS and/or at least one subsequent uplink subframe when the single tone uplink transmission is received in a PRACH.

In an aspect, the timing component 1512 may be configured to decode symbols of the single tone uplink transmission. For example, the timing component 1512 may be configured to decode symbols of the single tone uplink transmission based on at least one of a TBCC or a dual Reed-Muller code.

In an aspect, the timing component 1512 may be configured to determine a timing estimation based on a phase different between pairs of symbols in the plurality of symbols of the single tone uplink transmission. The timing component 1512 may provide this timing estimation to the transmission component 1510 for communication with the UE 1550.

In an aspect, the timing component 1512 may be configured to determine a timing offset associated with the UE 1550 based on a phase difference of RS symbols in the plurality of symbols before a CRC of the single tone uplink transmission passes.

In another aspect, the timing component 1512 may be configured to determine the timing offset associated with the UE 1550 based on data symbols and RS symbols after the CRC of the single tone uplink transmission passes. For example, the timing component 1512 may re-encode and/or re-module symbols (e.g., data symbols) of the single tone uplink transmission. The timing component 1512 may determine the timing offset associated with the UE 1550 based on the re-encoded and/or re-modulated symbols.

The apparatus may include additional components that perform each of the blocks of the algorithm in the aforementioned flowchart of FIG. 12. As such, each block in the aforementioned flowchart of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 16:
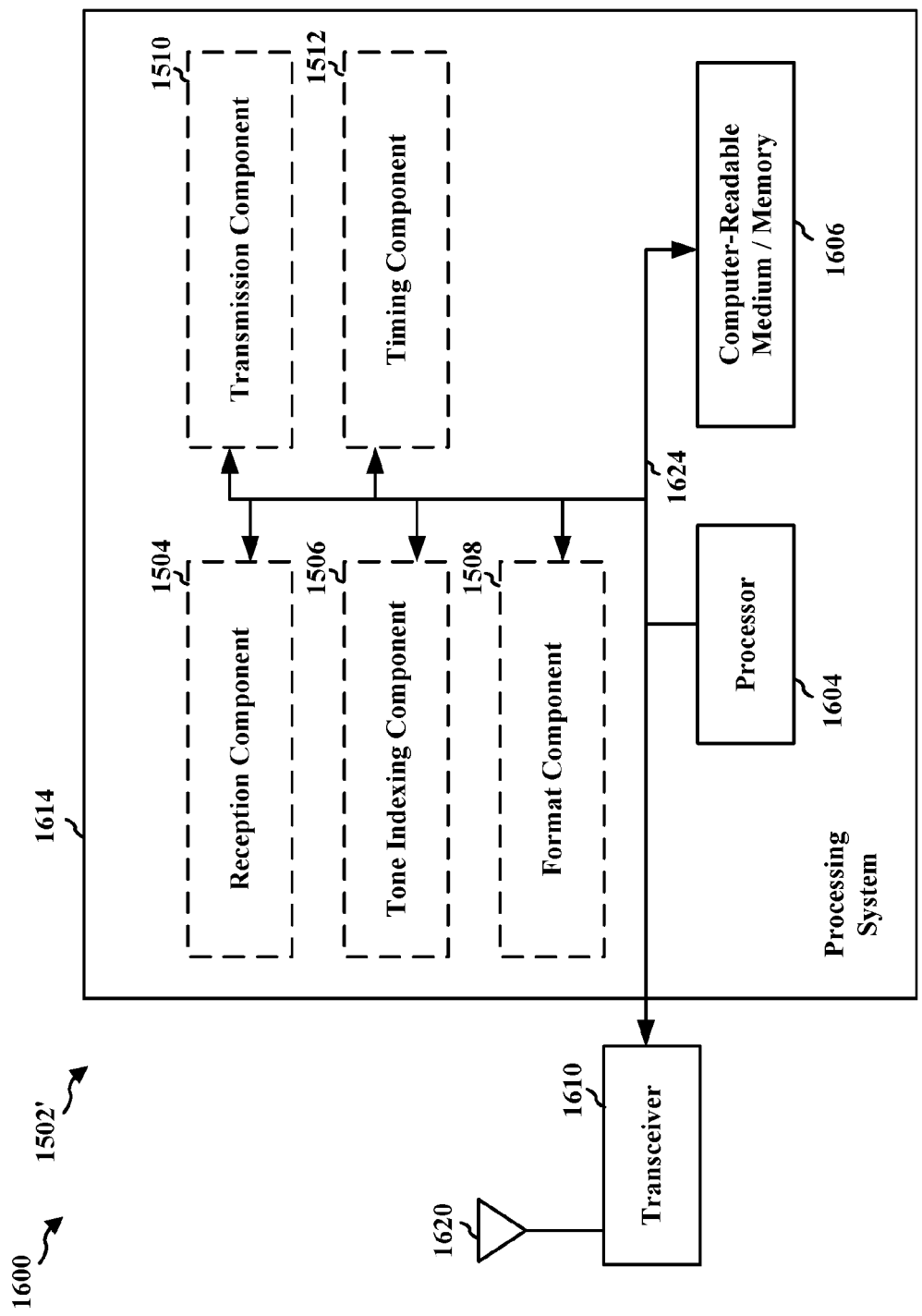
FIG. 16 is a diagram illustrating an example of a hardware implementation for an apparatus employing a processing system.

FIG. 16 is a diagram 1600 illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware components, represented by the processor 1604, the components 1504, 1506, 1508, 1510, 1512, and the computer-readable medium/memory 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The transceiver 1610 receives a signal from the one or more antennas 1620, extracts information from the received signal, and provides the extracted information to the processing system 1614, specifically the reception component 1504. In addition, the transceiver 1610 receives information from the processing system 1614, specifically the transmission component 1510, and based on the received information, generates a signal to be applied to the one or more antennas 1620. The processing system 1614 includes a processor 1604 coupled to a computer-readable medium/memory 1606. The processor 1604 is responsible for general processing, including the execution of software stored on the computer-readable medium/memory 1606. The software, when executed by the processor 1604, causes the processing system 1614 to perform the various functions described supra for any particular apparatus. The computer-readable medium/memory 1606 may also be used for storing data that is manipulated by the processor 1604 when executing software. The processing system 1614 further includes at least one of the components 1504, 1506, 1508, 1510, 1512. The components may be software components running in the processor 1604, resident/stored in the computer readable medium/memory 1606, one or more hardware components coupled to the processor 1604, or some combination thereof. The processing system 1614 may be a component of the eNB 310 and may include the memory 376 and/or at least one of the TX processor 316, the RX processor 370, and the controller/processor 375.

In one configuration, the apparatus 1502/1502' for wireless communication includes means for signaling, to at least one UE, information indicating different tone indices for use in transmitting a plurality of symbols in a single tone uplink transmission. The apparatus 1502/1502' may further include means for receiving the plurality of symbols in the single tone uplink transmission. In an aspect, pairs of symbols in the plurality of symbols are received in the single tone uplink transmission in the different tone indices of the single tone uplink transmission. In an aspect, each tone index of the different tone indices is associated with a different frequency. In an aspect, the plurality of symbols includes a first set of symbols from a first UE and a second set of symbols from a second UE; and the plurality of symbols comprises at least one of data symbols or RS symbols.

In an aspect, the means for receiving the plurality of symbols in the single tone uplink transmission is configured to receive a first symbol of a first symbol pair in a first tone index and receive a second symbol of the first symbol pair in a second tone index that is a fixed frequency difference from the first tone index. In an aspect, the means for receiving the plurality of symbols in the single tone uplink transmission is configured to receive a third symbol of a second symbol pair in the first tone index and receive a fourth symbol of the second symbol pair in the second tone index that is the fixed frequency difference from the first tone index. In an aspect, In an aspect, the means for receiving the plurality of symbols in the single tone uplink transmission is configured to receive a third symbol of a second symbol pair in a third tone index that is a non-fixed frequency difference with respect to the second tone index and receive a fourth symbol of the second symbol pair in a fourth tone index that is a fixed frequency difference with respect to the third tone index.

In an aspect, the information associated with the different tone indices indicate a frequency hopping pattern. In an aspect, the means for receiving the plurality of symbols in the single tone uplink transmission is configured to receive at least one pair of data symbols in a subframe in the different tone indices and receive at least one pair of RS symbols in the subframe in the different tone indices.

In an aspect, if the single tone uplink transmission is received in a PUSCH, the plurality of symbols includes a first number of RS symbols. In an aspect, if the single tone uplink transmission includes an ACK, the plurality of symbols includes a second number of RS symbols. In an aspect, if the single tone uplink transmission includes CQI, the plurality of symbols includes a third number of reference signal (RS) symbols. In an aspect, the first number of RS symbols, second number of RS symbols, and third number of RS symbols are the same or at least one of the first number of RS symbols, second number of RS symbols, and third number of RS symbols are different. In an aspect, if the single tone uplink transmission is received in a PRACH, the single tone uplink transmission includes at least one of a reduced tone spacing or a reduced number of the plurality of symbols in each subframe.

In an aspect, the apparatus 1502/1502' may further include means for determining a timing estimation based on a phase difference between the pairs of symbols. In an aspect, the apparatus 1502/1502' may further includes means for determining a timing offset associated with the at least one UE based on a phase difference of RS symbols in the plurality of symbols before a cyclic redundancy check (CRC) of the single tone uplink transmission passes. In an aspect, the apparatus 1502/1502' may further include means for determining the timing offset of the at least one UE based on the data symbols and the RS symbols after the CRC of the single tone uplink transmission passes by re-encoding and re-modulating the data symbols.

In an aspect, the apparatus 1502/1502' may further includes means for signaling, to the at least one UE, information associated with a format for use in transmitting the plurality of symbols in the single tone uplink transmission. In an aspect, the format includes least one of a CP length associated with the plurality of symbols, a symbol duration, or a subframe duration. In an aspect, the format is either preamble based without a payload or message based with a payload.

In an aspect, if the single tone uplink transmission is received in a PRACH, the means for receiving the plurality of symbols in the single tone uplink transmission may be configured to receive the single tone uplink transmission in an UpPTS and/or configured to receive the single tone uplink transmission in the UpPTS and at least one subsequent uplink subframe. In an aspect, a coding scheme of single tone uplink transmission is based on at least one of a tail-biting convolutional code (TBCC) or a dual Reed-Muller code.

The aforementioned means may be one or more of the aforementioned components of the apparatus 1502 and/or the processing system 1614 of the apparatus 1502' configured to perform the functions recited by the aforementioned means. As described supra, the processing system 1614 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
   receiving signaling from a base station that indicates different tone indices; and
   transmitting a plurality of symbols in a single tone uplink transmission,
   wherein groups of symbols in the plurality of symbols are transmitted in the single tone uplink transmission using the different tone indices indicated by the received signaling, and wherein a first symbol of a first symbol pair of the plurality of symbols is transmitted using a first tone index and a second symbol of the first symbol pair is transmitted using a second tone index that is a fixed frequency difference from the first tone index.

2. The method of claim 1, wherein each tone index of the different tone indices is associated with a different frequency.

3. The method of claim 1, wherein the plurality of symbols comprises at least one of data symbols or reference signal (RS) symbols.

4. The method of claim 1, wherein the transmitting the plurality of symbols in the single tone uplink transmission further comprises:
   transmitting a third symbol of a second symbol pair using the first tone index; and
   transmitting a fourth symbol of the second symbol pair using the second tone index that is the fixed frequency difference from the first tone index.

5. The method of claim 1, wherein the transmitting the plurality of symbols in the single tone uplink transmission further comprises:
   transmitting a third symbol of a second symbol pair using a third tone index that is a non-fixed frequency difference with respect to the second tone index; and
   transmitting a fourth symbol of the second symbol pair using a fourth tone index that is a fixed frequency difference from the third tone index.

6. The method of claim 1, wherein the different tone indices of the received signaling indicate a frequency hopping pattern.

7. The method of claim 1, wherein the transmitting the plurality of symbols in the single tone uplink transmission comprises:
   transmitting at least one pair of data symbols in a subframe using the different tone indices; and
   transmitting at least one pair of reference signal (RS) symbols in the subframe using the different tone indices.

8. The method of claim 1, wherein:
   if the single tone uplink transmission is transmitted in a physical uplink shared channel (PUSCH), the plurality of symbols includes a first number of reference signal (RS) symbols;
   if the single tone uplink transmission includes an acknowledgement (ACK), the plurality of symbols includes a second number of reference signal (RS) symbols;
   if the single tone uplink transmission includes channel quality information (CQI), the plurality of symbols includes a third number of reference signal (RS) symbols; and
   the first number of RS symbols, second number of RS symbols, and third number of RS symbols are the same; or
   at least one of the first number of RS symbols, second number of RS symbols, and third number of RS symbols are different.

9. The method of claim 1, wherein if the single tone uplink transmission is transmitted in a physical random access channel (PRACH), the method further comprises at least one of:
   reducing a tone spacing; or
   reducing a number of the plurality of symbols in each subframe.

10. The method of claim 1, further comprising:
    receiving signaling from a base station that indicates a format for use in transmitting the plurality of symbols in the single tone uplink transmission,
    wherein the format includes least one of a cyclic prefix (CP) length associated with the plurality of symbols, a symbol duration, or a subframe duration.

11. The method of claim 10, wherein the format is either preamble based without a payload or message based with a payload.

12. The method of claim 1, wherein if the single tone uplink transmission is transmitted in a physical random access channel (PRACH), the method further comprises at least one of:
    transmitting the single tone uplink transmission in an uplink pilot time slot (UpPTS); or
    transmitting the single tone uplink transmission in the UpPTS and at least one subsequent uplink subframe.

13. The method of claim 1, wherein a coding scheme of the single tone uplink transmission is based on at least one of a tail-biting convolutional code (TBCC) or a dual Reed-Muller code.

14. A method of wireless communication of a base station, comprising:
    signaling, to at least one user equipment (UE), information indicating different tone indices for use in transmitting a plurality of symbols in a single tone uplink transmission; and
    receiving the plurality of symbols in the single tone uplink transmission,
    wherein pairs of symbols in the plurality of symbols are received in the single tone uplink transmission in the different tone indices of the single tone uplink transmission, and wherein a first symbol of a first symbol pair of the plurality of symbols is received in a first tone index and a second symbol of the first symbol pair is received in a second tone index that is a fixed frequency difference from the first tone index.

15. The method of claim 14, wherein each tone index of the different tone indices is associated with a different frequency.

16. The method of claim 14, wherein:
the plurality of symbols comprises a first set of symbols from a first user equipment (UE) and a second set of symbols from a second UE; and
the plurality of symbols comprises at least one of data symbols or reference signal (RS) symbols.

17. The method of claim 14, wherein the receiving the plurality of symbols in the single tone uplink transmission further comprises:
receiving a third symbol of a second symbol pair in the first tone index; and
receiving a fourth symbol of the second symbol pair in the second tone index that is the fixed frequency difference from the first tone index.

18. The method of claim 14, wherein the receiving the plurality of symbols in the single tone uplink transmission further comprises:
receiving a third symbol of a second symbol pair in a third tone index that is a non-fixed frequency difference with respect to the second tone index; and
receiving a fourth symbol of the second symbol pair in a fourth tone index that is a fixed frequency difference with respect to the third tone index.

19. The method of claim 14, wherein the information associated with the different tone indices indicate a frequency hopping pattern.

20. The method of claim 14, wherein the receiving the plurality of symbols in the single tone uplink transmission comprises:
receiving at least one pair of data symbols in a subframe in the different tone indices; and
receiving at least one pair of reference signal (RS) symbols in the subframe in the different tone indices.

21. The method of claim 14, wherein:
if the single tone uplink transmission is received in a physical uplink shared channel (PUSCH), the plurality of symbols includes a first number of reference signal (RS) symbols;
if the single tone uplink transmission includes an acknowledgement (ACK), the plurality of symbols includes a second number of reference signal (RS) symbols;
if the single tone uplink transmission includes channel quality information (CQI), the plurality of symbols includes a third number of reference signal (RS) symbols; and
the first number of RS symbols, second number of RS symbols, and third number of RS symbols are the same; or
at least one of the first number of RS symbols, second number of RS symbols, and third number of RS symbols are different.

22. The method of claim 14, wherein if the single tone uplink transmission is received in a physical random access channel (PRACH), the single tone uplink transmission includes at least one of a reduced tone spacing or a reduced number of the plurality of symbols in each subframe.

23. The method of claim 14, further comprising:
determining a timing estimation based on a phase difference between the pairs of symbols.

24. The method of claim 14, further comprising:
determining a timing offset associated with the at least one UE based on a phase difference of reference signal (RS) symbols in the plurality of symbols before a cyclic redundancy check (CRC) of the single tone uplink transmission passes; or
determining the timing offset of the at least one UE based on the data symbols and the RS symbols after the CRC of the single tone uplink transmission passes by re-encoding and re-modulating the data symbols.

25. The method of claim 14, further comprising:
signaling, to the at least one UE, information associated with a format for use in transmitting the plurality of symbols in the single tone uplink transmission,
wherein the format includes least one of a cyclic prefix (CP) length associated with the plurality of symbols, a symbol duration, or a subframe duration.

26. The method of claim 25, wherein the format is either preamble based without a payload or message based with a payload.

27. The method of claim 14, wherein if the single tone uplink transmission is received in a physical random access channel (PRACH), the method further comprises at least one of:
receiving the single tone uplink transmission in an uplink pilot time slot (UpPTS); or
receiving the single tone uplink transmission in the UpPTS and at least one subsequent uplink subframe.

28. The method of claim 14, wherein a coding scheme of single tone uplink transmission is based on at least one of a tail-biting convolutional code (TBCC) or a dual Reed-Muller code.

* * * * *